United States Patent [19]
Wiedeman

[11] Patent Number: 5,303,286
[45] Date of Patent: Apr. 12, 1994

[54] WIRELESS TELEPHONE/SATELLITE ROAMING SYSTEM

[75] Inventor: Robert A. Wiedeman, Los Altos, Calif.

[73] Assignee: Space Systems/Loral, Inc., Palo Alto, Calif.

[21] Appl. No.: 678,931

[22] Filed: Mar. 29, 1991

[51] Int. Cl.$^5$ .................... H04M 11/00; H04B 7/185; H04B 1/00; G01J 1/34
[52] U.S. Cl. .......................................... 379/59; 379/60; 379/57; 379/56; 455/12.1; 455/13.1; 455/541; 340/825.06; 375/1
[58] Field of Search ................ 342/352, 357; 364/423; 379/56, 58, 59, 60, 57; 455/12, 54.1, 13; 375/1; 340/825.06

[56] References Cited

U.S. PATENT DOCUMENTS

| | | | |
|---|---|---|---|
| 4,424,417 | 1/1984 | Chaver et al. | 379/56 |
| 4,424,417 | 1/1984 | Chaver et al. | 379/56 |
| 4,672,655 | 6/1987 | Koch | 379/57 |
| 4,672,655 | 6/1987 | Koch | 379/57 |
| 4,672,656 | 6/1987 | Pfeiffer et al. | 379/58 |
| 4,672,656 | 6/1987 | Pfeiffer et al. | 379/58 |
| 4,833,701 | 5/1989 | Comroe et al. | 379/60 |
| 4,833,701 | 5/1989 | Comroe et al. | 379/60 |
| 4,901,340 | 2/1990 | Parker et al. | 379/60 |
| 4,901,340 | 2/1990 | Parker et al. | 379/60 |
| 4,972,456 | 11/1990 | Kaczmarek et al. | 379/60 |
| 4,972,456 | 11/1990 | Kaczmarek et al. | 379/60 |
| 4,972,460 | 11/1990 | Sasuta | 379/60 |
| 4,972,460 | 11/1990 | Sasuta | 379/60 |
| 5,008,952 | 4/1991 | Davis et al. | 455/12 |
| 5,008,952 | 4/1991 | Davis et al. | 455/12 |
| 5,073,900 | 12/1991 | Mallinckrodt | 375/1 |
| 5,073,900 | 12/1991 | Mallinckrodt | 375/1 |
| 5,073,900 | 12/1991 | Mallinckrodt | 379/59 |
| 5,081,703 | 1/1992 | Lee | 455/13 |
| 5,081,703 | 1/1992 | Lee | 455/13 |
| 5,179,374 | 1/1993 | Winger | 340/825.06 |
| 5,179,374 | 1/1993 | Winger | 340/825.06 |

FOREIGN PATENT DOCUMENTS

| | | | |
|---|---|---|---|
| 0365885 | 5/1990 | European Pat. Off. | 379/60 |
| 9013186 | 11/1990 | Int'l Appl. | 455/12.1 |
| 9109473 | 6/1991 | Int'l Appl. | 455/12 |

(List continued on next page.)

OTHER PUBLICATIONS

Kiesling, John D., "Land Mobile Satellite Systems", Proceedings of the IEEE, Jul. 1990, vol. 78, No. 7, pp. 1107–1115.

(List continued on next page.)

Primary Examiner—Curtis Kuntz
Assistant Examiner—William D. Cumming
Attorney, Agent, or Firm—Edward J. Radlo; Kenneth R. Allen

[57] ABSTRACT

A wireless telephone system capable of servicing a roaming wireless telephone user includes a satellite communications system consisting of one or more orbiting satellites, each carrying a database of users, destination codes and call codes, within a satellite service area, a satellite control center, and a plurality of terrestrial communications links. The system operates by effecting communication between a terrestrial wireless telephone end user transceiver apparatus and a terrestrial communications link via a single relay through a single satellite or a succession of satellites wherein the relay station may be in motion relative to the end user transceiver apparatus and the terrestrial communications link, wherein the orbiting relay station effects the ultimate decision on linking based on stored on-board information and on-board processing, and wherein the end user transceiver apparatus, the orbiting satellite and the terrestrial communications link are operative in cooperation with the on-board database to effect hand-off from a first orbiting satellite to a second orbiting satellite. The satellite system is a single satellite or preferably a constellation of satellites orbiting near the earth, all of which are capable receiving requests for calls and participating in the call routing and call setup on an autonomous basis.

8 Claims, 25 Drawing Sheets

FOREIGN PATENT DOCUMENTS

| | | | |
|---|---|---|---|
| 0175420 | 7/1989 | Japan | 455/54.1 |
| 0365885 | 5/1990 | European Pat. Off. | 379/60 |
| 9013186 | 11/1990 | Int'l Appl. | 455/12.1 |
| 9109473 | 6/1991 | Int'l Appl. | 455/12 |
| 0175420 | 7/1989 | Japan | 455/54.1 |

OTHER PUBLICATIONS

Chaddock, "A Proposed Architecture for a Mobile Telephone System Utilizing Multi-Beam Satellite Coverage" 1984, IEEE.

Gardiner, "Satellite Services for Mobile Communication" Telecommunications, Aug. 1986.

Ballard, et al, "Cellular Mobile Radio as an Intelligent Network Application" Electrical Communication vol. 63, #4, 1989.

Iridium—Miscellaneous materials related to public announcement Jun. 25, 1990 (Motorola, Inc.).

Application of Ellipsat Corp. to FCC. Nov. 2, 1990.

Foley, "Iridium; Key to Worldwide Cellular Communications" Telecommunications, Oct. 1991.

Weigel and Ratigan, "Using the Satellite Medium" Telecommunications, Oct. 1991.

Kiesling, John D., "Land Mobile Satellite Systems", Proceedings of the IEEE, Jul. 1990, vol. 78, No. 7, pp. 1107-1115.

Chaddock, "A Proposed Architecture for a Mobile Telephone System Utilizing Multi-Beam Satellite Coverage" 1984, IEEE.

Gardiner, "Satellite Services for Mobile Communication" Telecommunications, Aug. 1986.

Ballard, et al, "Cellular Mobile Radio as an Intelligent Network Application" Electrical Communication vol. 63, #4, 1989.

Iridium—Miscellaneous materials related to public announcement Jun. 25, 1990 (Motorola, Inc.).

Application of Ellipsat Corp. to FCC. Nov. 2, 1990.

Foley, "Iridium; Key to Worldwide Cellular Communications" Telecommunications, Oct. 1991.

Weigel and Ratigan, "Using the Satellite Medium" Telecommunications, Oct. 1991.

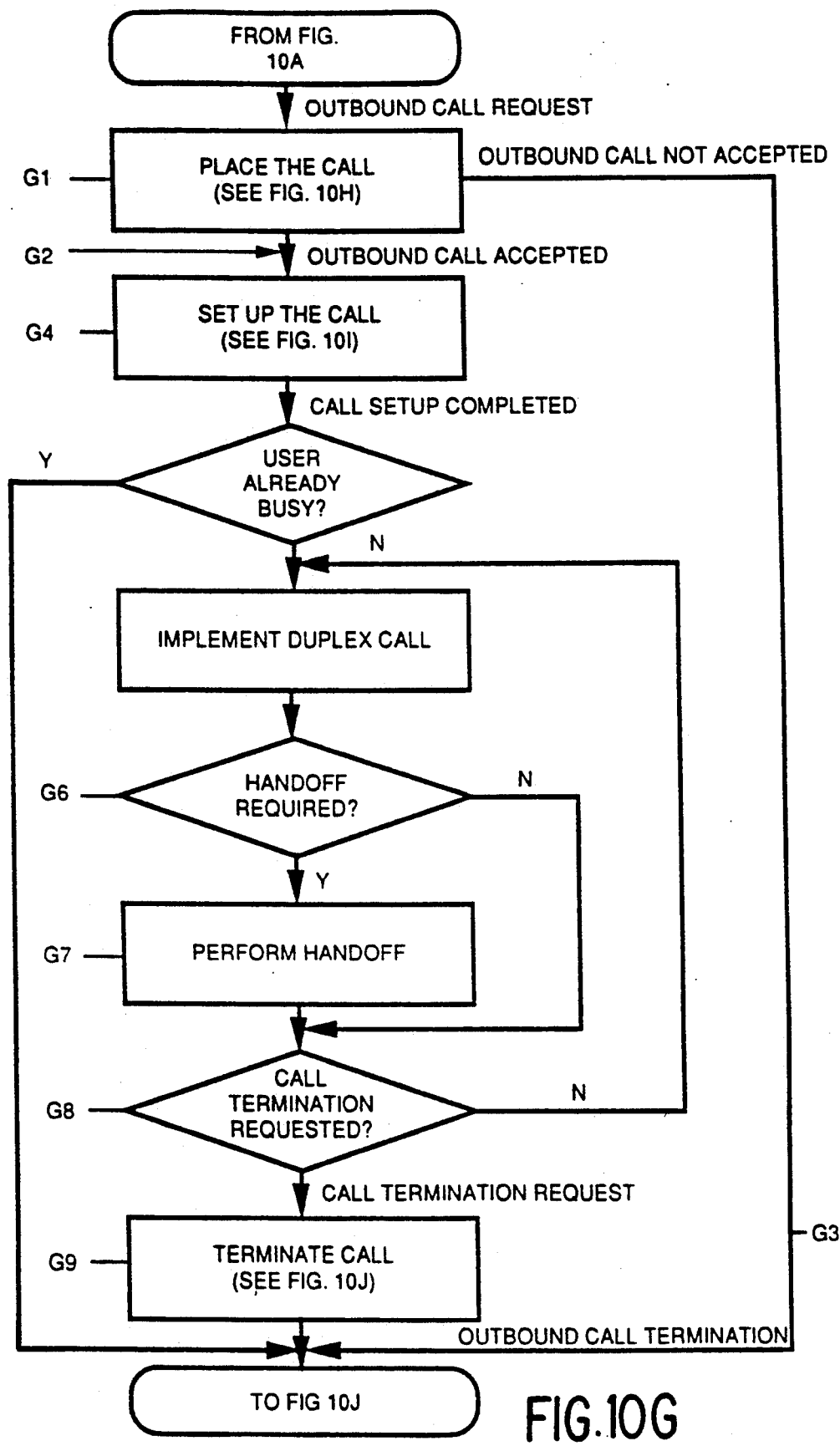

WIRELESS TELEPHONE/SATELLITE ROAMING SYSTEM

BACKGROUND OF THE INVENTION

This invention relates to a wireless telephone system for employing one or a plurality of orbiting satellites to allow wireless telephone users (subscribers) communication access to a terrestrial telephone system (whether private, government or common carrier), and particularly to a wireless telephone system, such as a cellular system, which permits subscriber access to terrestrial telephone networks while the subscriber is roaming in areas that do not have cellular telephone services.

There is a need to provide personal communications anywhere on the earth. Current communications systems, for example, cellular telephone systems, require terrestrial cellular relay stations to intercept and link a cellular radiotelephone transmission with conventional switched telephone users and with other cellular telephone users.

Cellular telephone systems have been proposed which account for roamers, i.e., cellular telephone users which roam outside a normal service area. The American Telephone and Telegraph Corp. (AT&T) has proposed an inter-cellular data network for interconnecting terrestrial cellular telephone service areas using a terrestrial packet-switched network that has nodes at the participating cellular telephone service areas wherein packet-switched network data is accumulated in a database of roaming cellular telephone users. The database therein proposed would keep track of roamers and allow terrestrial interconnection of the roamer to the telephone system when the roamer is located in a cellular telephone service area that is remote from a designated home cell. Certain data is collected which would allow routing of calls to the roaming user, allow issuance of billing information, and allow collection of other system operation data. The operation of the system is proposed as follows: A database of roaming users is notified via the user when the user desires to accept or make telephone calls while roaming. The user notifies the system of intention to roam via a digital signal from the cellular telephone. The roaming user is then logged into the database via a terrestrial or other packet-switched network. Upon entering a participating remote cellular telephone service area, the mobile transceiver apparatus would transmit a (burst) digital signal to the cellular telephone operator in the remote service area. The database of roaming users would then be updated to show the user's current service area. Incoming calls normally directed to the user home cell are thus routed to the proper service and switched to the user. Call screening and other features would allow the user to control the expenses. For outgoing calls, connections are made from the mobile transceiver apparatus to the current service area, which in turn handles connections to the public switched telephone system in the normal manner of cellular telephones. Means may be provided to provide for billing of the user via his home cell due to the database information provided by the packet switched data network.

Efforts are under way to utilize satellite technology in cellular communications. Satellite delivered telephone services to mobile users has been proposed as the Mobile Satellite System (MSS) in the USA. This system is now being implemented by the American Mobile Satellite Corp. (AMSC). It utilizes transceivers in the mobile unit (automobile for example) operating in the L-band (1530–1560 MHz and 1646.5–1660.5 MHz) that communicate to a satellite at geosynchronous orbit. In addition to significant expense to the end user for the transceiver apparatus, the system is subject to noticeable relay delay due to transmission of the signals to and from geosynchronous orbit. Furthermore, the cellular telephone service providers must nevertheless implement a costly additional inter-system network to direct calls to the mobile transceiver apparatus. The current system as envisaged does not have a method for locating the roaming user and directing the call to the user.

A search of U.S. Patent office records uncovered U.S. Pat. No. 4,972,456, assigned to GTE MobileNet, which discloses a cellular telephone "satellite" roaming system that uses a satellite system to permit access to the cellular telephone system when a user is located in areas outside of cellular telephone system coverage This system does not contemplate overhead orbiting satellites, but rather the system would employ subsidiary cell sites in a terrestrial-based cellular communications system.

Other patents uncovered relate to general information on cellular telephone roaming systems which permit a user of one cellular system to use another cellular system while traveling in areas outside a home cellular system. These patents include U.S. Pat. Nos. 4,901,340; 4,972,460; and 4,833,701.

Motorola, Inc. announced on Jun. 27, 1990 a proposed crosslinked satellite network under the name IRIDIUM. The IRIDIUM system is believed to be described in European Patent Publication EP 365,885, published May 2, 1990, and corresponding to U.S. patent application Ser. No. 263,849 filed 28 Oct. 1988 now abandoned. The IRIDIUM system envisions a rigid constellation of seventy-seven low-earth orbiting satellites in seven circular polar orbits for supporting cellular telephone communications on the earth's surface. In the IRIDIUM system, all handoff and relays of communications traffic are handled in space directly between satellites, so that the terrestrial telephone network is bypassed. However, ground signal processing is required to set up and place calls. Calls originating from outside the satellite service areas must interrogate the home location of the user in order to identify the user. The system requires that all satellites be linked constantly to one another. Each of eleven evenly-spaced satellites sharing an orbit is contemplated to project thirty-seven communications cells on the earth's surface. Due to cost and channel limitation, it may be presumed that the IRIDIUM system will not compete with the services provided by terrestrial-based cellular communications systems. A technical description of this invention is believed to be contained under U.S. patent application Ser. No. 263,849 filed Oct. 28, 1988 in the names of Bertiger, Leopold and Peterson.

By a document dated Nov. 2, 1990, Ellipsat Corporation made application to the Federal Communications Commission for authority to construct an elliptical orbit satellite system to support, among other things, mobile voice services in the United States through a constellation of six satellites. The service has been presented as complementary of and not competitive with existing and future (terrestrial) cellular telephone services. The system contemplates the use by end users of dual-mode transceivers using Carrier Division Multiple Access (CDMA) modulation to effect communications with earth satellites in extended-coverage elliptical orbit.

Current technology in the cellular telephone industry uses analog transmission at 30 kHz FM with many customer features such as autodial, portable operation etc. The next generation of equipment will be Time Division Multiple Access (TDMA) digital transceivers, due to be introduced in late 1990. Future generations of Cellular Telephones will use Code Division Multiple Access (CDMA) and spread spectrum modulation for solutions to communication traffic saturation of terrestrial cellular systems. Finally, a roaming network is being developed for the purpose of allowing cellular telephone customers the ability to roam from cell system to cell system in the USA (and other regions).

In the development of commercial terrestrial-based cellular telephone systems, it is expected that dual mode radios will be produced that will be able to access both analog and digital systems. With digital radios, additional services are expected to appear such as car to mobile facsimile (car fax), data transmission, computer interconnections and position location services.

Some high usage cellular systems, such as PACTEL's Los Angeles system, are expected to saturate in 1991. PACTEL and other cellular systems are looking toward Time Division Multiple Access (TDMA) as a step toward satisfying future needs. However, the system operators see even more capacity demands and have funded development of a CDMA-based technology. QUALCOMM in San Diego, California, has been funded by NYNEX and others to develop CDMA technology for cellular services. QUALCOMM has demonstrated a 9.6 KBPS voice codec with "toll quality" performance using CDMA technology. CDMA may become an industry standard since it is expected to relieve the "capacity" problem and is inherently less expensive as cell site equipment, particularly for rural service areas (RSAs).

CDMA may be used in connection with implementations of the present invention, but the use of other modulation schemes is not precluded.

SUMMARY OF THE INVENTION

According to the invention, a radio communication system capable of servicing a roaming user or the like outside the range of terrestrial relay stations includes a packet-switched network and database of roaming users, a satellite communications system having at least one but usually a plurality of orbiting satellites over a terrestrial satellite service area, a satellite control center and a plurality of terrestrial communications links, wherein call setup is controlled by processors and databases on board the orbiting satellites and wherein only after the satellite link for the communications channels is completed, does control and switching rely on ground-based equipment such that the orbiting satellites are integrated into a ground-based telephone network and tariff structure. The system operates by effecting communication between a terrestrial wireless telephone end user transceiver apparatus and a terrestrial communications link via only a single relay through a single satellite or a succession of the orbiting satellites wherein the relay station is in motion relative to the end user transceiver apparatus and to the terrestrial communications link, wherein the orbiting relay station effects the ultimate decision on linking based on stored on-board information and on-board processing, and wherein the end user transceiver apparatus, the orbiting satellite and the terrestrial communications link cooperate to effect hand-off from a first orbiting satellite to a second orbiting satellite other than the first orbiting satellite. All of the satellites are capable of receiving requests for calls and participating in the call routing and call setup on an autonomous basis. The satellites are capable of decoding the calls, switching, handing off of calls to other satellites, and updating databases of users based on information provided by network control.

The present invention offers substantial advantages while integrating with existing telephone systems. The invention allows wireless telephone with automatic switching (cellular) voice, data and facsimile communication to the public-switched telephone network in areas not served by terrestrial cellular telephone systems. The invention in particular will provide enhanced roaming cellular telephone services to cellular telephone service areas that have poor coverage, gaps in coverage, and other service area degradation. As a consequence there is also an increased ability to provide emergency communications services, such as reporting of medical emergencies, roadside breakdowns, tracking of stolen cars and other similar services in all areas served by satellite.

The invention will be better understood by reference to the following detailed description in connection with the accompanying drawings.

DESCRIPTION OF SPECIFIC EMBODIMENTS

Figure 1:
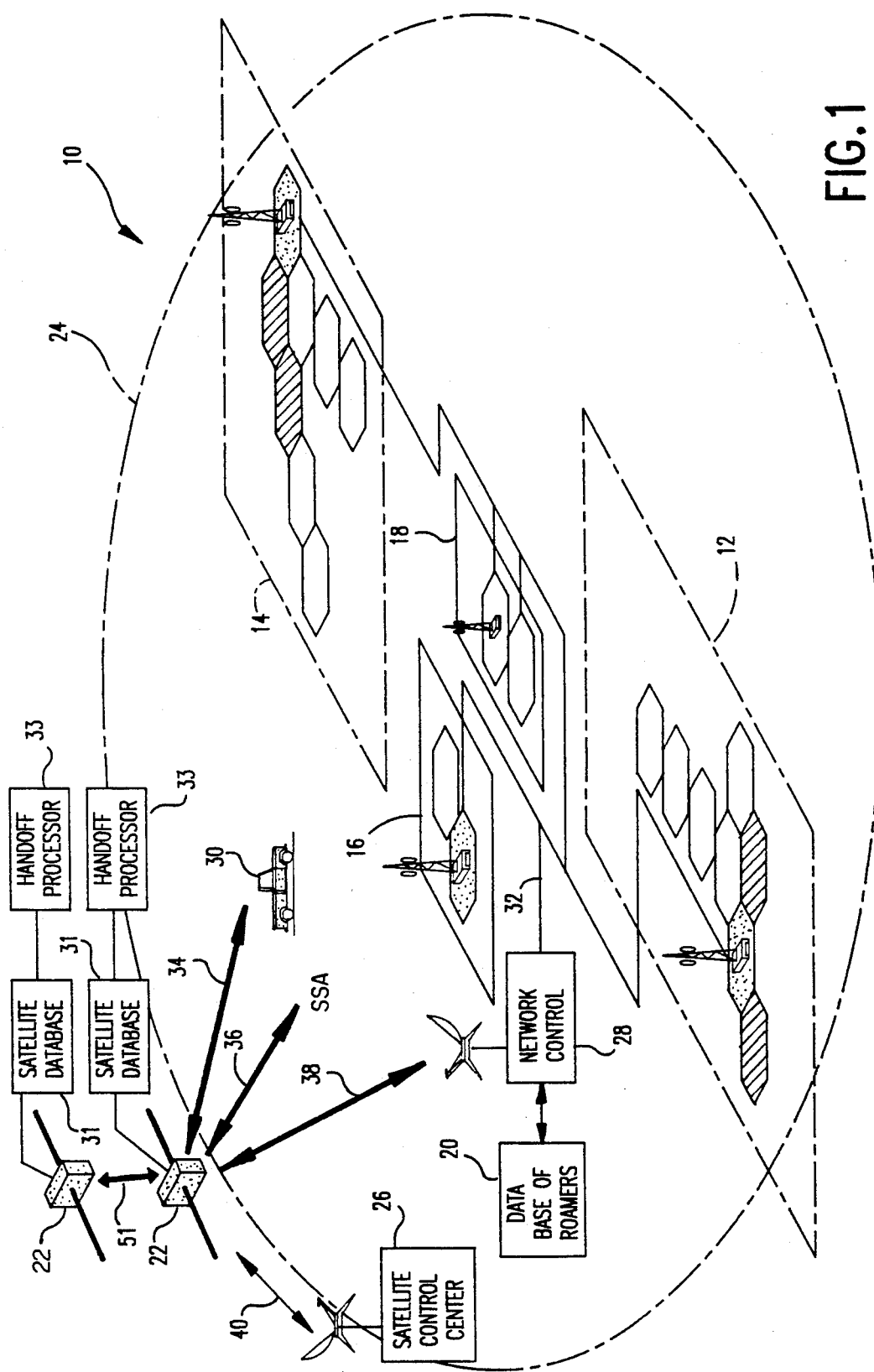
FIG. 1 is a figurative illustration of an integrated wireless telephone and orbiting satellite communications system in accordance with the invention.

An integrated wireless/satellite communications system 10 according to the invention is shown in FIG. 1. The system 10 may include private, government or cellular telephone systems which themselves comprise gateways 12, 14, 16, 18. The gateways may be conventionally-defined metropolitan service areas (MSAs) 12, 14, 16 and rural service areas (RSAs) 18, government telecommunications gateways, or private network nodes. The system 10 may further include according to the invention a database 20 of roaming users, a satellite communications system with a single one or a plurality of low-earth orbit satellites 22, each of which services a (moving) satellite service area 24, a satellite control center 26, a network control 28, a representative roaming end user 30, a packet switched network 32 and a plurality of satellite communications links, including for example cellular telephone communications links 34, 36, a network communications link 38 and a satellite control link 40.

In the exemplary cellular telephone systems, there is contemplated existing and future terrestrial wireless telephone systems. Herein they may be collectively referred to as a Gateway Telephone Service Areas (GTSAs) or Metropolitan Service Areas (MSAs) or Remote Service Areas (RSAs).

In accordance with the invention, there is provided a Satellite Service Area (SSA) 24 (which may be moving) having a communications link 36 capable of servicing any roaming user 30 within the SSA 24. The satellite control center 24 is to provide for proper operation of the satellite system 22, of the links to and from a plurality of satellites which are passing overhead and handing off communications traffic to one another, such as the satellite 22. The links include, in particular, the Satellite Control Link (SCL) 40, the Network Control Link (NCL) 38 and the Cellular Telephone Links (CTL) 34, 36.

The MSAs and the RSAs may be linked by present or proposed links, such as a nationwide packet switched network (NWN) 32 which may be used to establish the database 20 of roaming users. The NWN 32 may provide the service areas with information necessary to locate roaming users.

The satellite system 22 may comprise a single satellite or a constellation of about 24 to 48 satellites preferably in low-earth near circular or possibly elliptical orbits between selected latitudes. Each satellite is provided with command and communications subsystems which are capable of receiving requests for calls and participating in the call routing and call setup on an autonomous basis. Each satellite is operational to decode calls, to switch calls, to hand off calls to other satellites, and to update databases of users based on information provided by ground-based network control. The satellites do not serve as bypasses to ground-based telecommunications facilities.

The satellite control link 40 provides remote control of satellite components and configurations. The network communications link 38 provides for data transfer to and from the network control station 28 for the purpose of establishing communications to and from the roaming user 30. The wireless telephone links 34, 36 are used for voice and data communications, position location and other services between the user and various wireless telephone systems.

The wireless telephone user equipment preferably may be any commercially available unit that has the capability of digital signal generation and a compatible modulation scheme with the network into which it is to be integrated combined with digital and frequency generating equipment compatible with the satellite system. Code Division Multiple Access (CDMA) modulation or other modulation compatible with the satellite relay system are contemplated.

SYSTEM OPERATION

Operation of the system according to the invention is first described in connection with FIG. 2 and FIG. 3 as follows:

Notification is a first procedure. The roaming user 30 notifies the system either by a special control signal to the present satellite system 22 as shown in FIG. 2 by a relay path A-C to a network control 28 or if in service area range by a special control signal to the nearest service area base station 37, that the user 30 desires to be placed in the database 27 of roaming users and that the user will be exiting the service area of the terrestrial system. The special control signal which is communicated to the network control 28 is processed either by the service area or satellite software and routed outward from the net control 28 to the packet switched network 32. The database 20 at network control 28 is updated to include the user 30 as a roamer. The satellite 22 is notified of the acceptability of the user 30, and a satellite database 31 is updated to show the user 30 roaming in the SSA 24. The databases 27 of all MSAs and RSAs 12, 14, 16, 18 are then updated to show the user 30 to be in the Satellite Service Area (SSA) 24. This condition exists until the user 30 re-enters a service area of the terrestrial cellular system.

There are two kinds of telephone calls: incoming (inbound) to the satellite 22 from the (roaming) user 30; and outgoing (outbound) to the user from the terrestrial network.

Incoming calls initiated by the user 30, not located in a gateway terrestrial service area, begins with a request to the satellite 22 to access to the public switched telephone network (PSTN). The satellite 22 processes the request and checks its database 31 for the user 30. Depending on ephemeris and call destination, the call is accepted by the satellite 22 or another satellite whose service area overlaps. If accepted, call routing and database information are processed to route the call to the desired GTSA. The call may be directed to the user's home service area 12 or to any other location within the satellite service area. The call is set up for example as shown in FIG. 2 via path A-B, under database control of the satellite. No ground control is required. The remote GTSA 16 then acknowledges the request and processes the call to the call destination through a public switched circuit 17. Channels and/or codes are assigned and the remote databases 27 are updated to show that the user equipment is busy. A handoff processor 33 aboard the satellite 22 is updated to enable handoff from one satellite to another if required. The remote GTSA 16 notifies the network control 28, via the packet switched network 32, that the call is being set up to allow the network control 28 to note in its database 20 that the user 30 is busy, and thereafter databases 27 of all GTSAs are updated to show the user as busy. Subsequent to call setup the user 30 and the call destination 50 are connected via two-way wireless (cellular) telephone communications links A-B, as shown in FIG. 2. These communications may be carried out using spread spectrum modulation techniques and Code Division Multiple Access (CDMA) channels, or other modulation compatible with the satellite system, using equipment located at the user 30 position, and equipment located at the remote GTSA in the satellite service area (SSA). The CDMA or other modulation signal is converted to a voice signal at both the user and the remote GTSA. At the user end, the signal is converted either to an analog signal for voice and sent to a loudspeaker or converted to a digital signal and sent to another device for further processing of data. At the remote GTSA end 38 the signal is converted to either a voice signal or digital data and sent via a PSTN switch (not shown) for further routing via the public switched telephone network 17 to the call destination 50. After communications is ended, a signal from either end of an "on-hook" condition signifies end of communication.

The call termination processes proceed as follows: The remote MSA 16 notifies the satellite 22 of call termination, and the network control database 29 is notified of call termination and billing information. The satellite 22 database 31 is updated to show the user 30 not busy, and the handoff processor 33 is reset. The network control 28 notifies the GTSAs via packet network 32 of user not busy.

Consider the situation where a remote location called the "caller" desires to make a telephone call to a cellular telephone user 30 that is roaming and is not located in a terrestrial cellular telephone service area (TCTSA). The call is initiated as shown in FIG. 3. The caller 50 uses the PSTN 21 to call the user's wireless (cellular) telephone number at the user's home GTSA 12 or perhaps some other equivalent location. The call is transferred by the PSTN switch to the user's home GTSA. The home GTSA equipment 23 processes the call and, by accessing the database 27 of roaming users either directly or via the packet network 32, finds that the user 30 is roaming in the satellite service area 24 and thereby knows to route the call to the satellite 22. The home GTSA equipment 23 then routes a request for route planning to the route planner 25. The route planner 25 selects the appropriate GTSA to handle the call. If the home GTSA 12 is selected, the home GTSA 12 makes a call setup transmission to the satellite 22. The satellite 22, upon receiving the request signal, checks the satellite database 31, processes the information, and based on the information in its database 31 accepts or rejects the call. If the route planner selects another GTSA, such as equipment 16, to handle the call, the selected GTSA 16 is signaled by the home GTSA 12, and the home GTSA 12 switches the call request to the desired GTSA 16 to process the call setup. The call setup is as described above for the home GTSA.

If it accepts a call for connection, the satellite 22 sets up the call. The satellite 22 transmits the GTSA request for access to the user 30. If accepted by the user 30, an acknowledgment is transmitted to the satellite 22. The satellite 22 updates the satellite database 31 to show the user 30 to be busy, and then it updates the handoff processor 33. The satellite assigns channels and upon connection to the caller the home GTSA notifies, via the packet network 32, network control 28 that the user is busy. Network control 28 then updates the GTSA's databases 27 to show that the user is busy. Subsequent to call setup, the user and the call destination are connected via two-way wireless telephone communications links via path A-D, as shown in FIG. 3. As before, the communications are carried out over Code Division Multiple Access (CDMA), or other compatible modulation, channels using equipment located at the user position, and equipment located at the remote GTSA in the satellite service area. After communications is ended, a signal from either end of an "on-hook" condition signifies end of communication. After communications is ended a signal from either end of an "on-hook" condition signifies end of communication.

The user at some point may decide to either terminate roaming in the SSA 24 or may re-enter a GTSA. If the user 30 desires to terminate roaming in the SSA 24 he has two options: First, the user 30 may put his equipment on standby, thereby causing his equipment to not respond. This has the effect of temporarily making the user 30 unavailable for taking outbound calls to him. Alternatively, the user 30 may remove his identifying codes from the database 20 of SSA roamers. To effect the removal from the database 20, the user 30 must notify the database 20, typically via the satellite 22, of intent to discontinue roaming in the SSA. The satellite database 31 is updated to delete the user 30. The satellite 22 notifies network control 28 of the user intention, and the network database 20 is updated to delete the user 30 from the database 20. The GTSA databases 27 are also updated at to show the user 30 to be removed. The network control station 28 then notifies other satellites 22 to advise them to delete the user from each database of users 33, thereby maintaining in each satellite an accurate roaming database of users in substantially real-time and allowing the satellites to control substantially all active call control functions independent of ground control.

Figure 4:
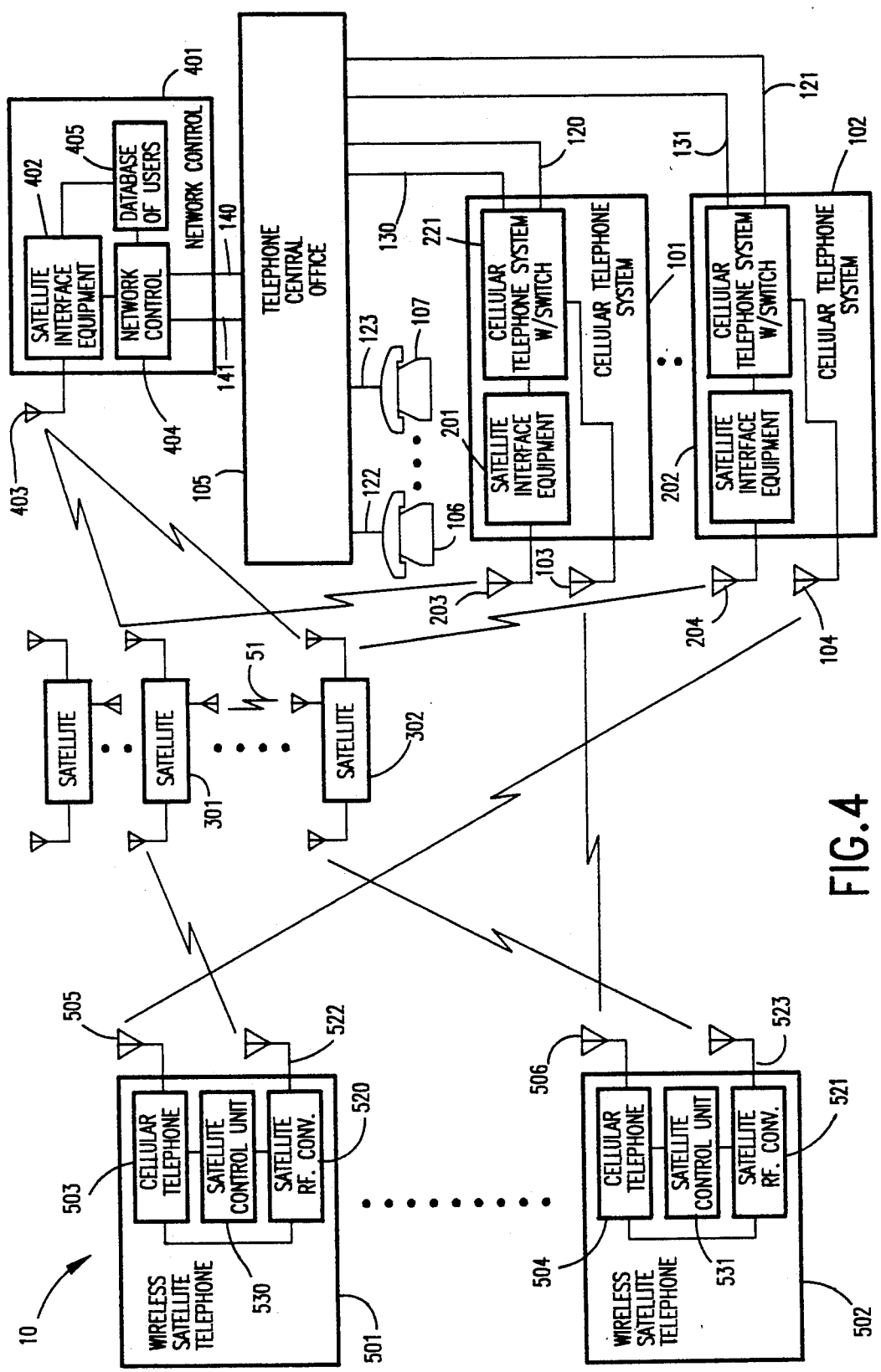
FIG. 4 is a system block diagram according to the invention.

In FIG. 4 there is illustrated the principal control elements in a cellular telephone system 10 for providing voice, data and other electronic telephone services to portable and mobile telephones located anywhere in a large geographical area. Terrestrial cellular telephone systems (TCTSs) 101,102 are provided with first antennas 103,104 located at many base sites throughout a geographical area to be served (SSA) 24 (FIG. 1). The TCTSs 101,102 are connected to a telephone central office (TCO) 105 with voice (and data) landlines 120,121 and with signaling network (packet) land lines 130,131. The TCTS 101, 102 may be any commercially available cellular telephone system or other gateway equipment (e.g., private systems). The TCTS 101,102 may be equipped with satellite interface equipment (SIEs) 201,202. The SIEs 201,202 have second antennas 203,204 that have the purpose of transmitting signals to and receiving signals from the satellites 301,302. The TCTSs 101,102 are also connected to the network control (NC) 401 by landlines 140,141 via the TCO 105. The NC 401 is equipped with a set of Network Satellite Interface Units 402 and a network control antenna 403. The network control antenna at 403 is for transmitting to and receiving signals from the satellite system 301,302.

The TCO 105 connects the NC 401 to the CTS 101,102. The TCO 105 also connects the TCTSs 101,102 to the call destination telephones 106,107. These telephones may be any commercially-available product that can interface to a public switched telephone system and transmit voice and/or data. Also shown in FIG. 4 are Cellular Satellite Telephones (CST) 501. The Cellular Satellite Telephones 501 are equipped with Cellular Telephones (CT) 503 and third antennas 505 which transmit to and receive signals from the TCTS 101 via first antennas 103. In addition the cellular satellite telephones are equipped with Satellite RF Units (SRFU) 520 and fourth antennas 522 which transmit to and receive signals from the satellites 301,302 (FIG. 4). The CSTs 501 include a Satellite Control Unit (SCU) 530 which provides signalling functions to the network.

Figure 5:
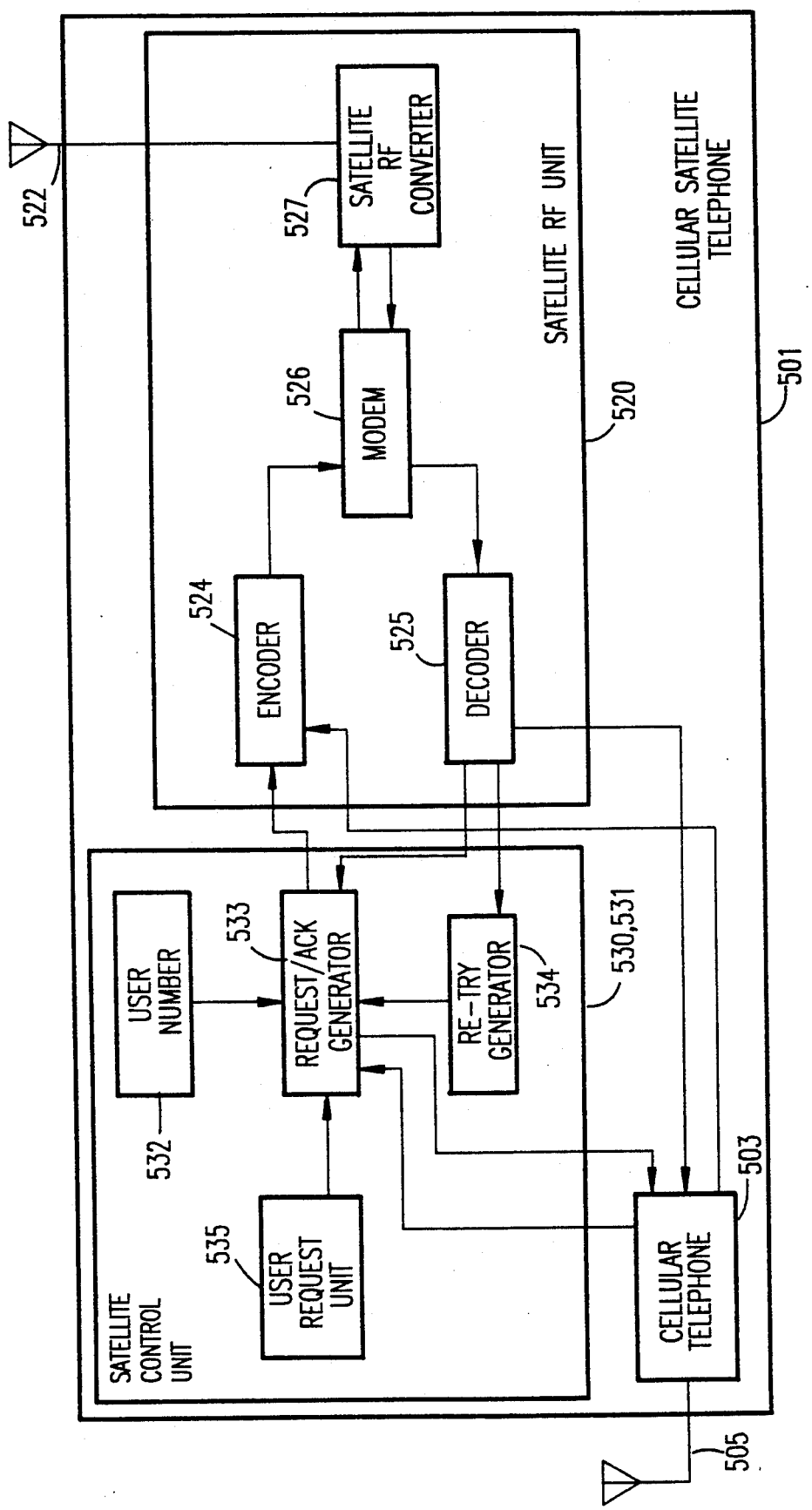
FIG. 5 is a block diagram of a wireless transceiver apparatus for use by an end user.

Referring to FIG. 5, there is illustrated in more detail a CST 501 of FIG. 4. The CST 501 may include a conventional cellular telephone 503 equipped with a transceiver, a handset and many options (not shown), and it is expected that the terrestrial roaming network may require digital terminals for this purpose. The cellular telephone 503 accommodates multiple telephone numbers and may be assigned a special satellite roaming number. The CST 501 is further equipped with a satellite control unit (SCU) 530 which includes storage for a user number 532, a request/ACK generator 533 and a retry generator 534. The CST 501 also includes a satellite RF Unit 520 which includes encoders 524, decoders 525, a modem 526 and a satellite RF converter 527.

The system 10 communicates between satellites using a network which controls handoffs of calls in process. When a satellite is about to lose communication between a user and a TCTSA that is handling the call, the satellite initiates requests for a handoff to another satellite. The links to establish the handoffs are shown in FIG. 4. From Satellite 301 to Satellite 302 is link 51.

Figure 6:
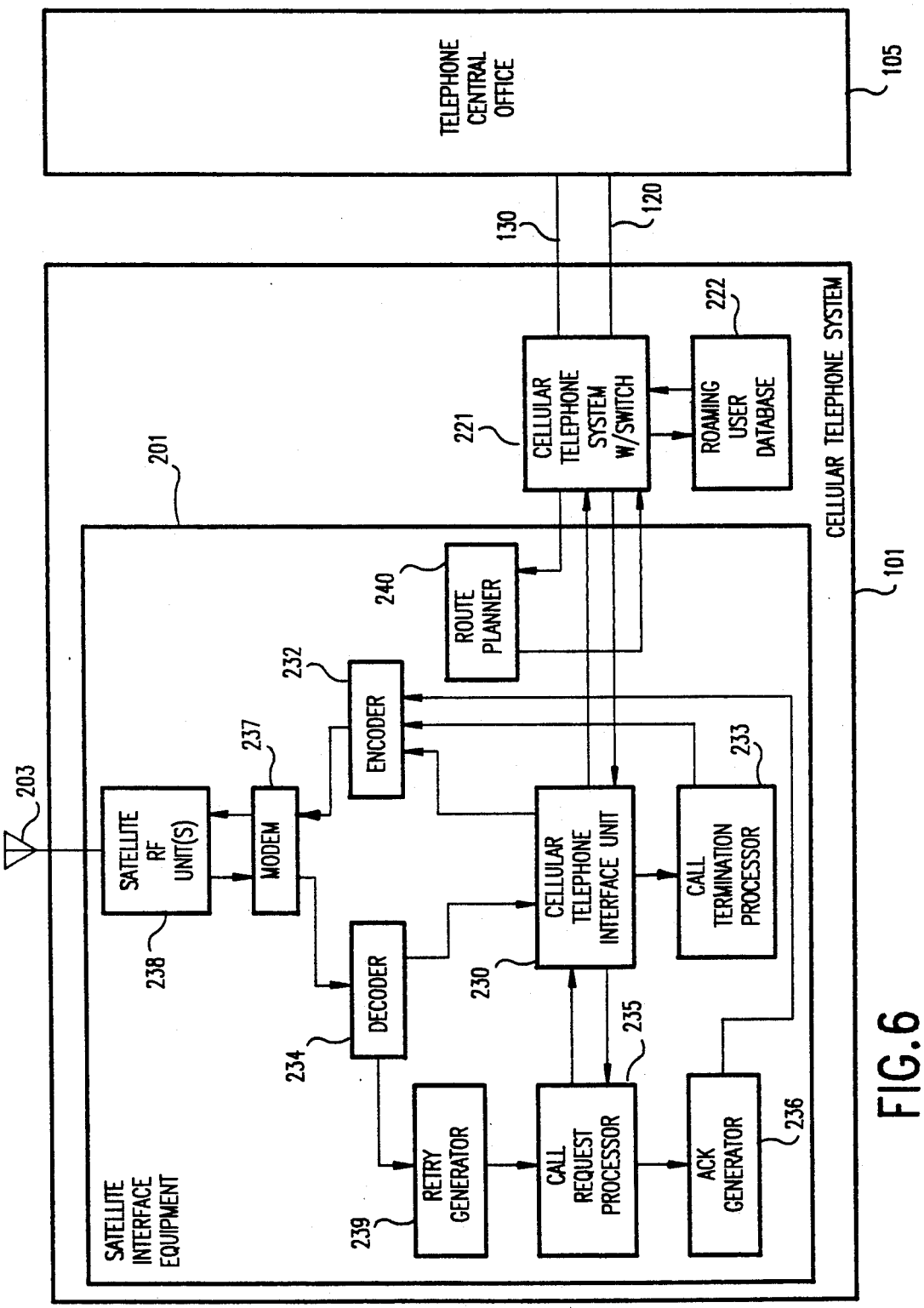
FIG. 6 is a block diagram of a gateway terminal unit for use in a cellular system according to the invention.

Referring to FIG. 6 there is shown in more detail a unit of the terrestrial cellular telephone system (TCTS) 101. The TCTS 101 with switch 221 may be any commercially available cellular telephone system or other gateway equipment (e.g., private systems). The TCTS 101 is interfaced to the Telephone Central Office 105 via landlines 120. The system is also interfaced by way of a signalling network (packet) to the TCO 105 by landlines 130 and therethrough to a network controller 401 (FIG. 4) via landlines 140,141.

The TCTS cellular equipment 101 also includes special equipment according to the invention for the purpose of communicating to and from the user Cellular Satellite Telephones (CTS) 501 by way of radio links through the satellite 301. This special equipment called the Satellite Interface Equipment (SIE) 201 (FIG. 6) includes a Route Planner 240 which processes outbound calls to users from other callers and provides route planning to connect a caller to a user depending upon user location, the satellite ephemeris, and other planning criteria. The SIE 201 also includes a Cellular Telephone Interface Unit 230 that processes and conditions the voice and data signals and interfaces the call requests, call termination signals, and ACK data signals to the encoder 232, the Cellular Telephone System 221 and the Call Termination Processor 233. A Call Request Processor 235 takes access data from the decoder 234, via the retry generator 239, and either directs it to the Cellular Telephone Interface Unit 230 or routes it to the ACK generator 236. Signals from the ACK generator and the Call Termination Processor are applied to the encoder 232. Modem 237 modulates signals from the encoder 232 and demodulates signals from the Satellite RF Unit 238. The output from the antenna 203 is applied to the RF unit 238 to receive signals from the satellites 301. Likewise, the output of the satellite RF unit 238 is applied to the antenna 203 in order to transmit to the satellite(s).

Figure 7:
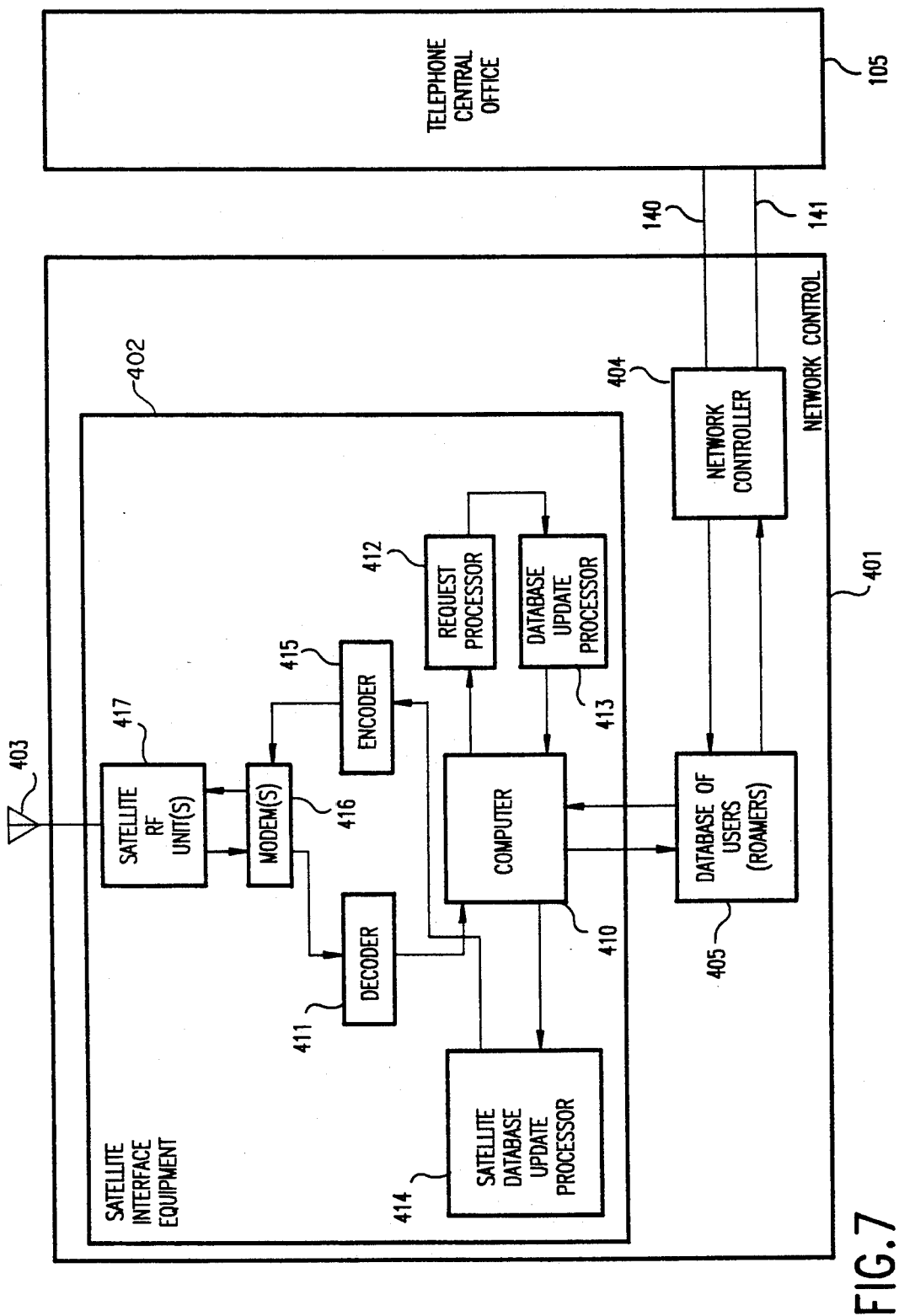
FIG. 7 is a block diagram of a network control center for use in a system according to the invention.

Referring to FIG. 7 there is shown in more detail the Network Control (NC) 401. The NC 401 comprises commercially available equipment with the express purpose of creating and maintaining a database of cellular telephone users that are roaming nationwide or worldwide. This equipment may consist of computers, memory storage devices, interface equipment, modems and the like. This system may contain or be interfaced to additional databases and database management systems. The database is managed by a network controller 404 and receives and exchanges data from and with the Terrestrial Cellular Telephone Systems 101 by way of landlines 140,141 connected via the TCO 105. The database 405 also receives data from specialized Satellite Interface Equipment (SIE) 402. The SIE 402 comprises a computer 410 which receives data from the database 405 and sends data to the database 405. The computer 410 receives decoded data from a decoder 411 and passes it to a request processor 412. The request processor 412 processes the request and provides instruction to a database update processor 413. The database processor 413 formats the data from the request processor 412 and instructs the computer 410 to pass data to the database 405 and/or to a Satellite Database Update Processor 41 4. The Satellite Database Update Processor 414 formats the data for updating the satellites 301,302 (FIG. 4). This formatted data is passed to the encoder 415. Data transmitted to and received from satellite RF Unit(s) 417 is applied to modems(s) 416. Output from modem 416 is directed to the decoder 411. Input to modem 416 is from the encoder 415. The satellite data is routed to the antenna 405 for transmittal to a satellite 301. Likewise, signals transmitted by the satellites 301, 302 are received by the antenna 403 and are directed through the Satellite RF Unit 417.

Figure 8A:
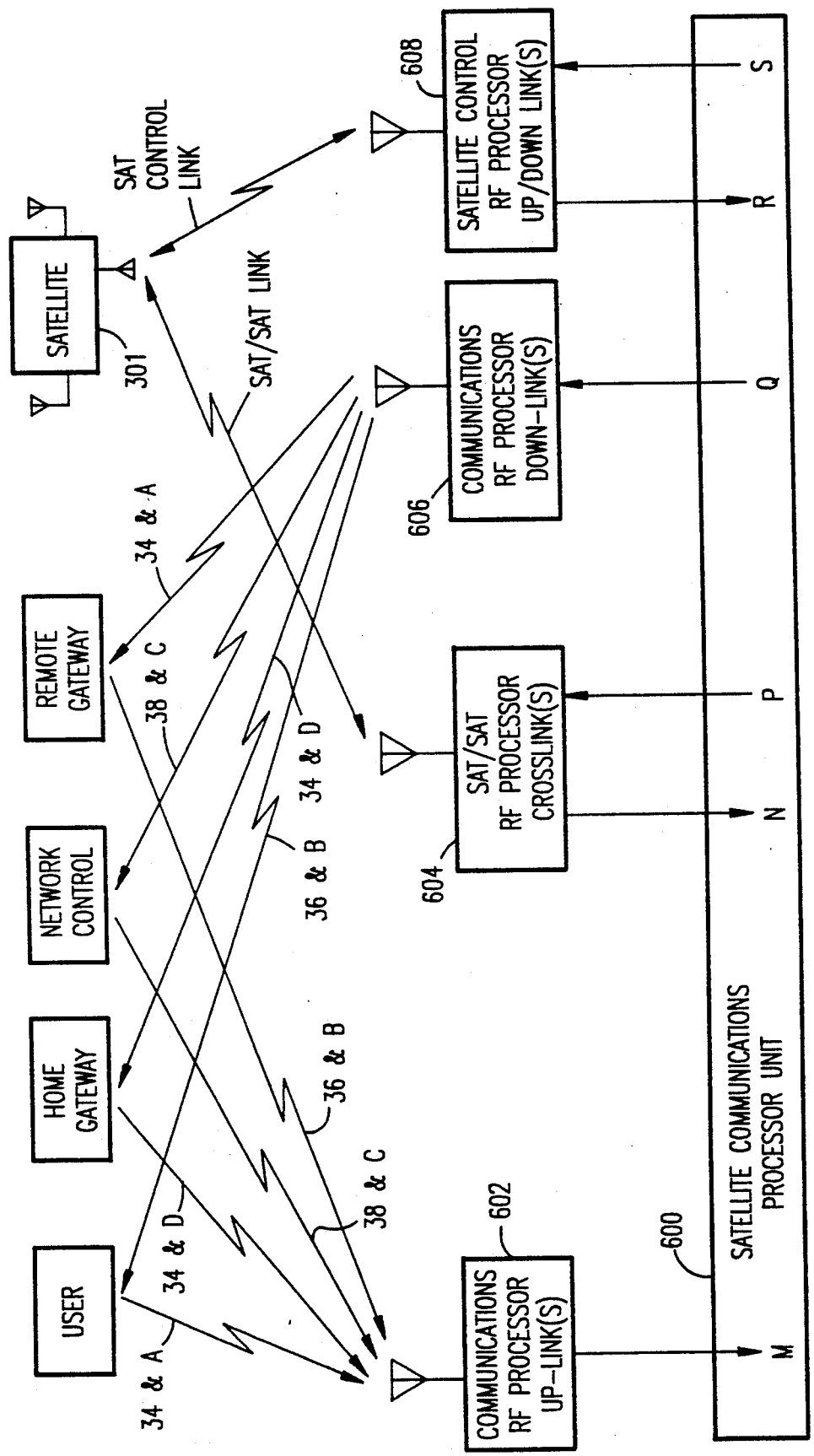
FIGS. 8, 8A-8C together are a block diagram of a satellite control system for use in a system according to a first embodiment of the invention which does not use Code Division Multiple Access (CDMA) encoding and decoding techniques.
Figure 8B:
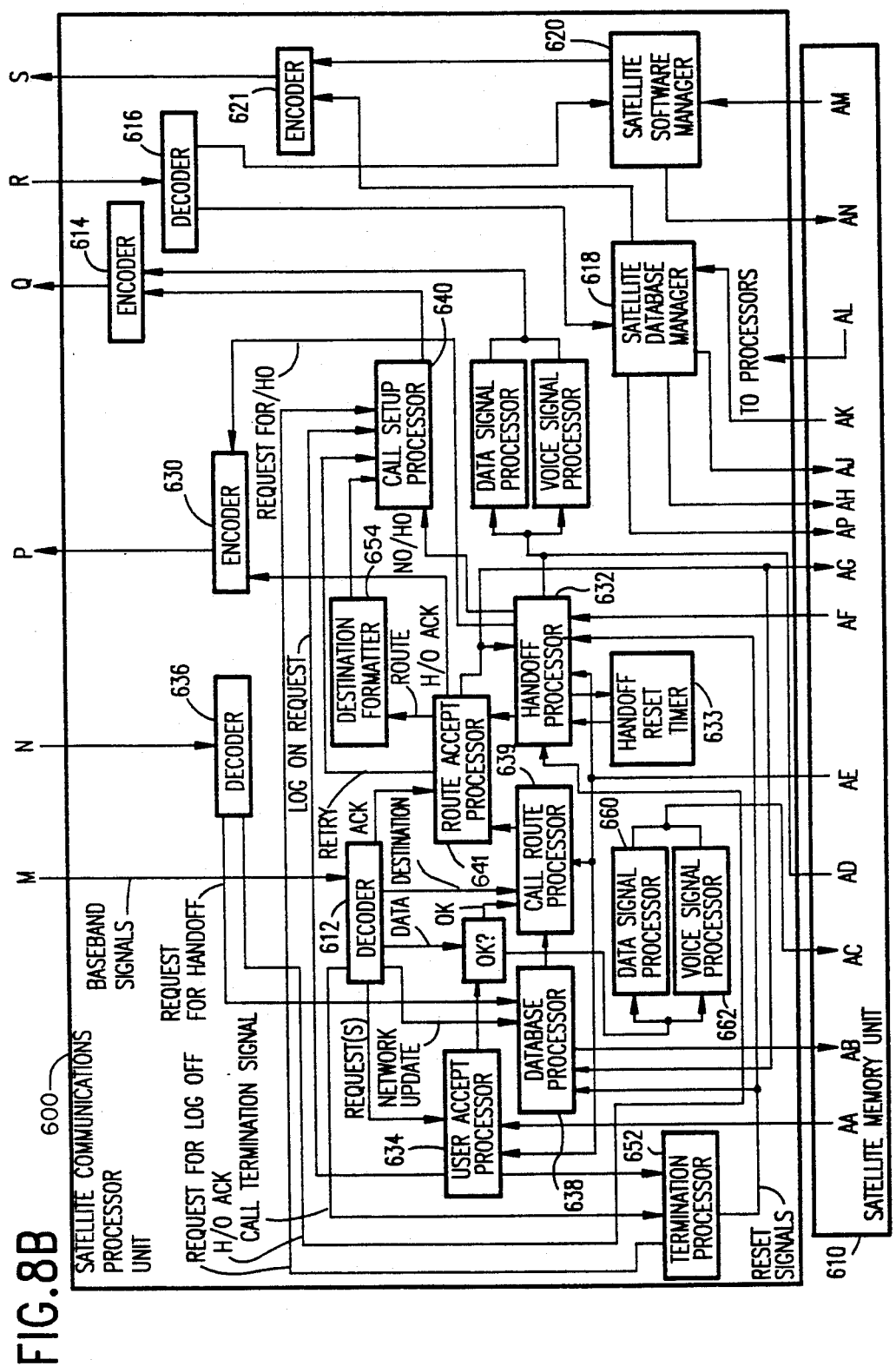
Figure 8:
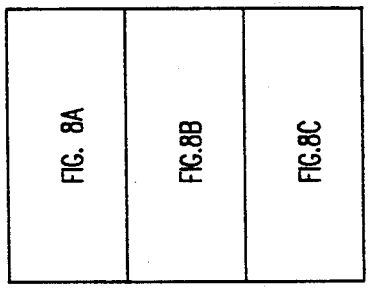
Figure 8C:
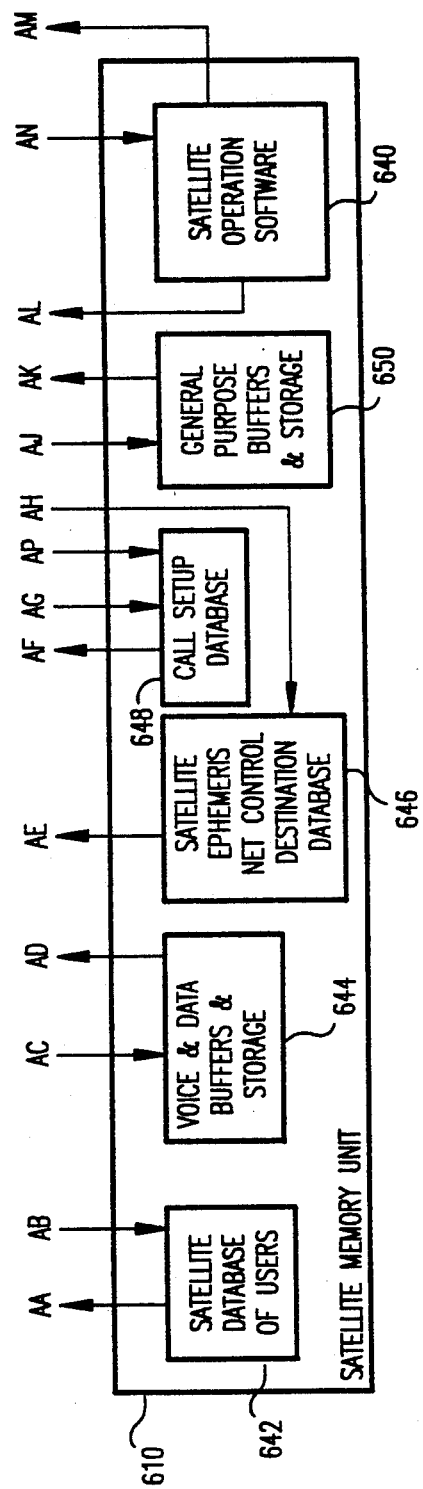
Figure 9A:
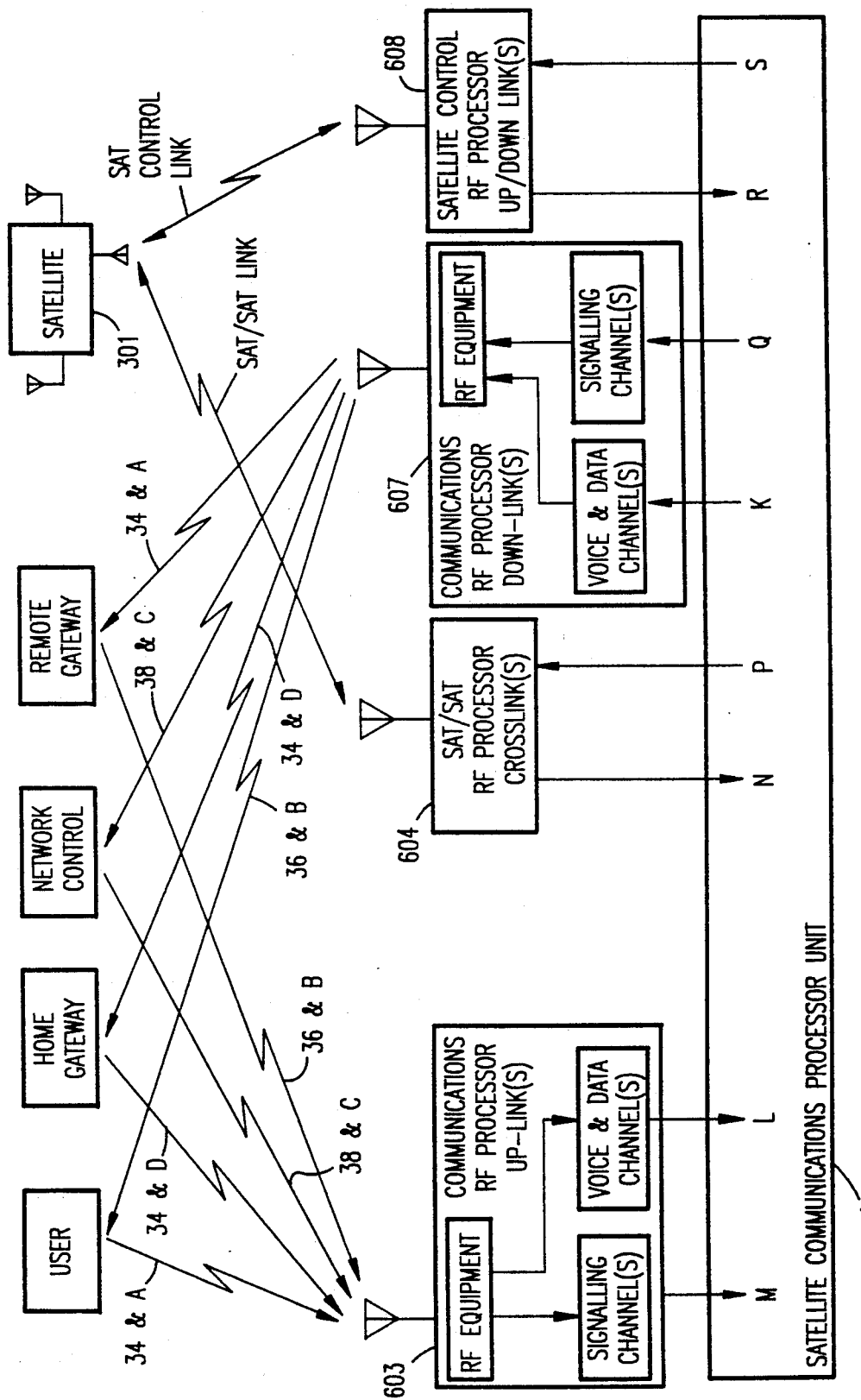
FIGS. 9, 9A-9C together are a block diagram of a satellite control system for use in a system according to a first embodiment of the invention which uses Code Division Multiple Access (CDMA) encoding and decoding techniques.
Figure 9B:
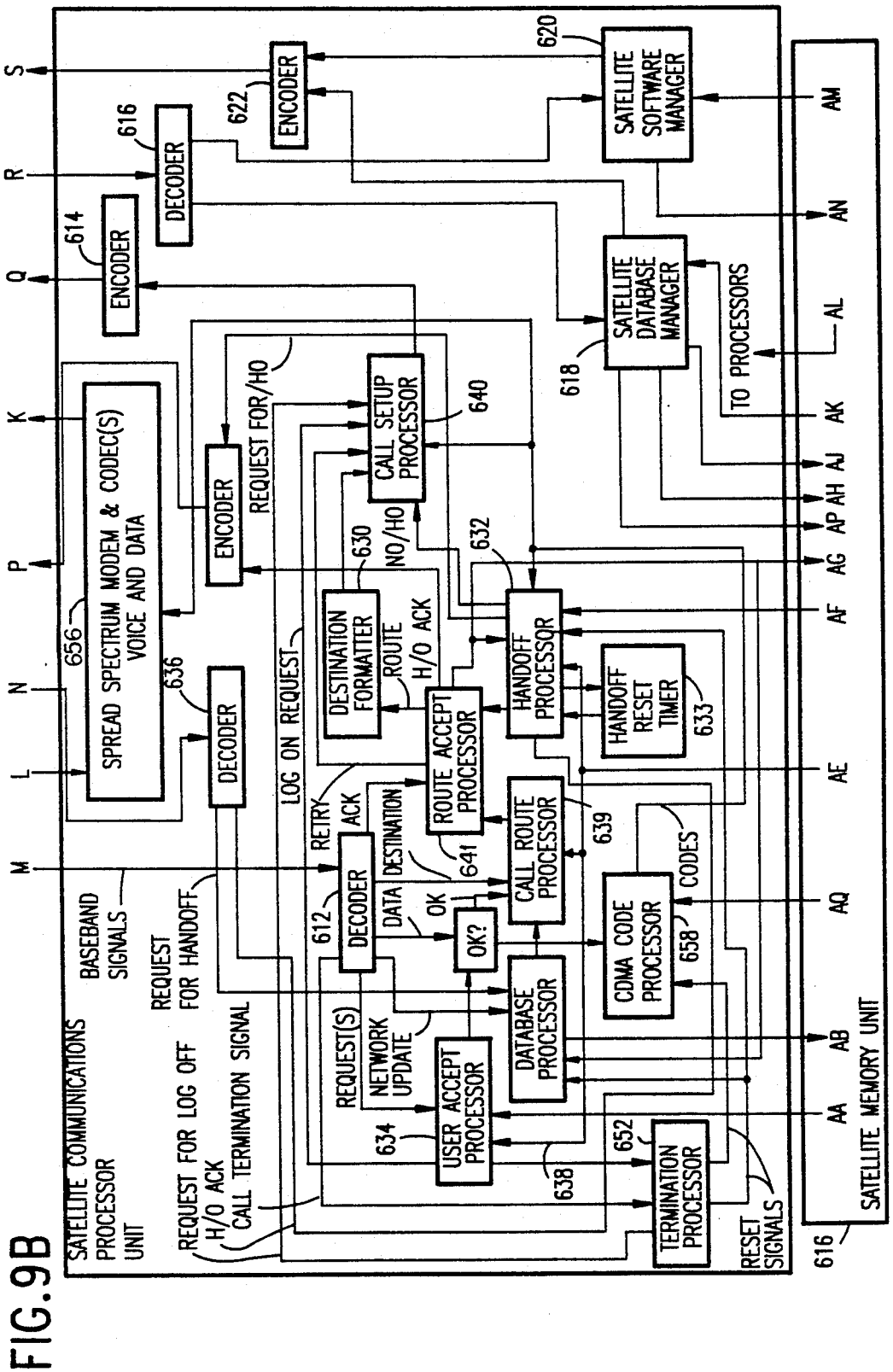
Figure 9:
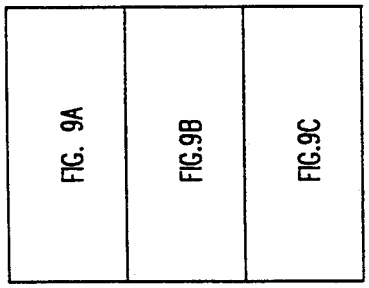
Figure 9C:
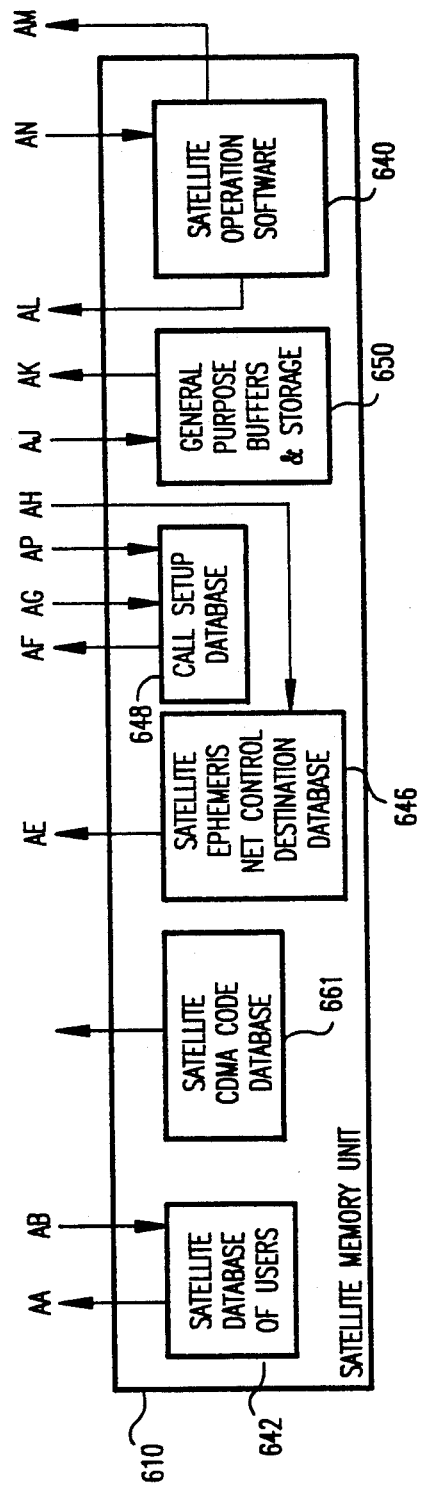

A functional block diagram of the satellite payload for a non CDMA system is shown in FIGS. 8A–8C. A functional block diagram for CDMA system is shown in FIGS. 9A–9C. The satellite payload comprises, respectively, Satellite Communications Processor (SCP) 600, 601 and supporting subsystems, including communications RF processor up-links (SCRFU) 602, 603 satellite to satellite RF processor crosslinks 604, communications RF processor down-links 606, 607, satellite control RF processor up/down links 608, the satellite memory unit (SMU) 610, as well as support elements not shown. The communications payload consisting of the SCRFU 602, 603, the Satellite Communications Processor (SCPU) 600, 601, and the Satellite Memory Unit (SMU) 610, forms the heart of the system. The SCRF 602, 603 cooperate with four or more types of Communication Radio Frequency (RF) Processors, namely, communications up-links, communications down-links, communications crosslinks and control uplinks/downlinks. The communication system may be channelized into many channels depending on the traffic requirements and available bandwidth.

The communication RF processors 602,603,606,607,608 receive signals from transmitters on the ground and convert the signals to digital form to be applied to a decoder 612 in the SCP 600 or receive encoded signals from the SCP 600 and convert them to RF and transmit them to the ground. The satellite control RF processor 608 may be implemented as a single unit or as two separate units (one for uplink and one for downlink).

The communications RF processor-uplink(s) 602 may receive signals from the ground by an antenna and convert the received signals into a baseband digital bit stream (M). The digital bit stream is applied to the satellite communications processor 600 for decoding. Once decoded the signal is routed to various portions within the processor depending on the function to be performed. The implementation of the SCP 600 may be a single large scale integrated circuit or individual components. The processes described will, however, be performed as shown. The detailed control of the processes are by satellite stored software which thereby permit remote modification of the stored software as may be needed. The resulting signals are applied to an encoder 614. The resulting digital bit stream is then applied to the communications RF processor-downlink(s) 606,607 for conversion to RF and transmission to the ground. A separate set of satellite control links, shown as the satellite RF processor up/down link(s) 608 are used for controlling the communications system, other sub-systems, and maintaining the satellite operation software. The uplink signals to the satellite are down converted to a baseband digital bit stream and applied to a decoder 616. The output of the decoder 616 is then applied to a satellite database manager 618 and a satellite software manager 620 in the SCP 600, 601. Digital signals from other portions of the satellite, the databases, buffers, storage, and satellite operation software are applied through the satellite database manager 618 and the software manager 620 to an encoder 621,622 for relay to the satellite control RF processor-downlink 608 for conversion to RF and transmission to the ground.

Referring FIGS. 8A and 9A, separate satellite to satellite links, namely, satellite RF processor crosslink(s) 604, are used for communications required to coordinate the satellite to satellite handoff and other housekeeping functions. The link(s) to the other satellite(s) may be provided as a baseband digital bit stream applied to an encoder 630 from a handoff processor 632. The output of the encoder 630 is then applied to a satellite/satellite RF processor 604. The resulting link is received by the satellite to satellite RF processor (not shown) of other satellite(s) 301 in view. Signals received from other satellites 301 are processed as a resulting digital bit stream which is then applied to a satellite/satellite decoder 636 and resulting signals are applied to a database processor 638 and the handoff processor 632 for accomplishing the handoff of the call from one satellite to another.

The satellite memory unit 610 comprises read only memory (ROM) (not explicitly shown) and random access memory (RAM) (not explicitly shown) or other memory such as EEPROM for storing satellite software 640, user database data 642, user communications voice and data 644 (FIG. 8C only), satellite ephemeris and destination databases 646, call setup databases 648, and general purpose buffers and storage 650. In specific embodiments, there is also a CDMA code database 660 (FIG. 9C).

The Satellite Communications Processor Unit (CPU) 600 comprises decoders to transform the digital bit streams into various signals.

In addition to the decoders there are certain other functional elements of the satellite communications processor 600. These are referred to as processors. The processors act upon instructions called software stored in the SMU 610 to cause functions to be performed in accordance with their special purpose. The functions are carried out by microprocessors. The functions may be carried out by individual processors or shared by as few as several or even one processor. The functions are shown in FIGS. 8A-C and 9A-C as individual blocks. The routing of the data is shown in FIGS. 8A-C and 9A-C. The functions of the various components are:

| PROCESSOR FUNCTIONS | |
|---|---|
| 1) USER ACCEPT PROCESSOR | Takes input from the USER ID signal and the Satellite Database of Users and signals |

| PROCESSOR FUNCTIONS | |
|---|---|
| | the OK module that the user is in the database and provides a code set for identifying him |
| 2) DATABASE PROCESSOR | A function that takes network update information or reset signals and processes them for managing the Satellite Database of Users |
| 3) CALL ROUTE PROCESSOR | This function takes the call destination and processes the signal along with data from the Satellite Ephemeris and Destination Database for application to the Route Acceptance Processor |
| 4) ROUTE ACCEPTANCE PROCESSOR | The Route Acceptance Processor takes data from the Call Route processor and makes a satellite decision on whether or not to accept the call. If not OK it signals the call set up processor to cause retry. If accepted it buffers the call destination signals the destination formatter then awaits ACK signal to setup |
| 5) HANDOFF PROCESSOR | The Handoff Processor sets up call handoffs between satellites based on information from the Satellite Ephemeris and Destination database and the call setup database. |
| 6) DESTINATION FORMATTER | The destination formatter provides codes for the signals to route them to the proper destination. |
| 7) CALL SETUP PROCESSOR | The call setup processor provides signals to the encoder for relay to network control of user requests for roaming or discontinuance of roaming, and signals to the remote base or the user of inbound or outbound calls, retry signals, and codes to route data and voice calls |
| 8) DATA & VOICE PROCESSORS | These processors provide the function of processing stored data into data streams for application to the encoder |
| 9) TERMINATION PROCESSORS | These processors provide the function or signalling of a call termination and provide reset signals. |
| 10) CDMA PROCESSORS | These processors select CDMA codes for the call from a database of codes stored on the satellite. |

Certain of these processors generate internal control signals and codes for guiding the satellite functions and routing of signals and data within the SCPU.

It is useful to understand the operation of the system by users and callers. A user (30) is defined to be an operator who is equipped with a device capable of requesting access, making and receiving calls with equipment 501,502 shown in FIG. 4 via satellites 301,302, cellular telephone system equipment 101,102, terrestrial lines or other means 120,121 and telephone central office 105 or other central switching means, and terrestrial lines or other means 122,123 to callers 106,107. A caller is defined to be an operator who is equipped with a device capable of requesting access, making and receiving calls with equipment 106,107 via terrestrial lines or other means 122,123, and telephone central office 105 or other switching 105, and terrestrial lines 120, 121 or other means, and cellular telephone system equipment 101,102, and via satellites 301,302 to the user 30 equipped with equipment 501,502.

The following description details the method of operation of the system for carrying out several processes. These processes are:

1 Establishing the user as a roamer in the SSA
   #1A Request for roaming by user in SSA
   #1B Request for roaming by user in TCTSA
   #1C Satellite Database update to include user
2 Call initiation by a User (an Inbound Call)
   #2A Call initiation from User (Inbound)
   #2B Sat acceptance of calls from user (Inbound)
   #2C Call setup process (Inbound)
   #2D Inbound call acceptance retry notice
   #2E Inbound call duplex operation
   #2F Handoff of inbound and outbound calls
   #2G Call termination (Inboud call)
   #2 Call initiation by a Caller (an Outbound Call)
3A Call initiation by caller (Outbound)
   #3B Call routing (Outbound)
   #3C Call setup process (Outbound)
   #3D Outbound call acceptance retry notice
   #3E Outbound call duplex operation
   #3F Handoff of Inbound and Outbound calls
   #3G Call termination (Outbound call)
4 Notification for Discontinuance of roaming by User
   #4A Request to discontinue roaming by user in SSA
   #4B Request to discontinue roaming by user in TCTSA These processes and their sub-processes as explained hereinafter are outlined in a flow chart shown in FIGS. 10A through 10L.

ESTABLISHING A USER AS A ROAMER

Figure 10A:
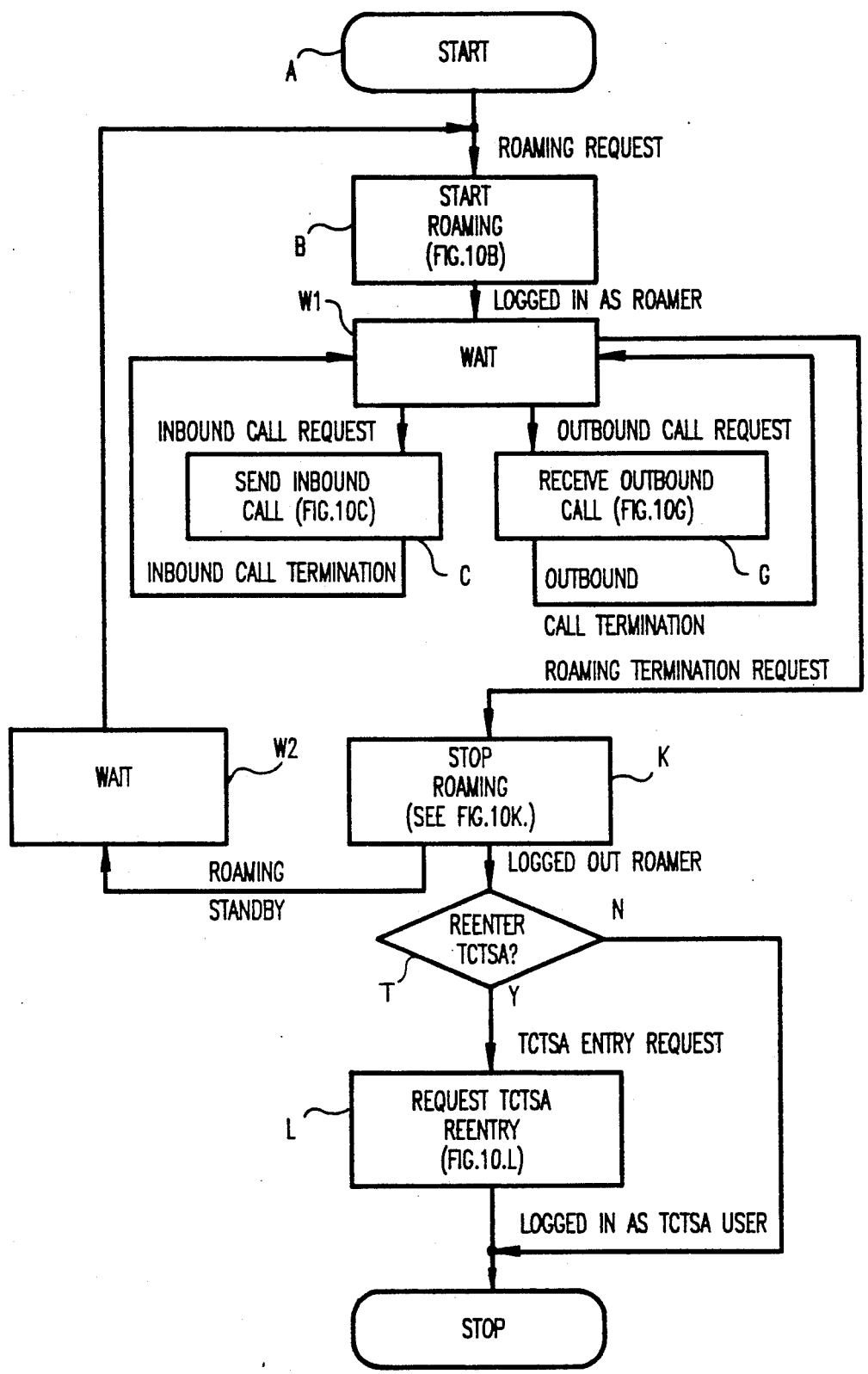
FIGS. 10A-10L together are a flowchart of operation of a specific embodiment of the invention.

Consider a user wishing to be established as a roamer. The user must establish that he is a authorized user to have access to the communications facility (FIG. 4; FIG. 10A, Step B, FIG. 10B). The user has two options; he may notify Network Control (NC) of his intention while in the SSA and out of range of a TCTSA and have his request processed via a satellite relay to the NC (FIG. 10B, Steps B1, B2, B3); or he may make his request via a participating TCTSA (Steps B1, B4, B3). These two cases are now described: REQUEST FOR ROAMING BY USER IN SSA Referring to FIG. 2, a method of a user signaling the Network Control that he wishes to roam can be illustrated. In this case the potential roamer is located in the SSA and not in a TCTSA. The user, operating the Wireless Satellite Telephone (WST) 501,502, either manually or automatically actuates the User request Unit 535 (FIG. 5) which activates the Request/ACK generator 533 and formats a pre-set user number 532 onto a data stream that includes a manually or automatically-entered user location code and passes it to the encoder 524. The encoder 524 processes the datastream into a signal and routes it to the modem 526 for modulating the signal, which passes it to the Satellite RF Converter 527, which then activates the satellite antenna 522,523 (see FIG. 4) and causes an RF signal to emanate from the device.

Figure 2:
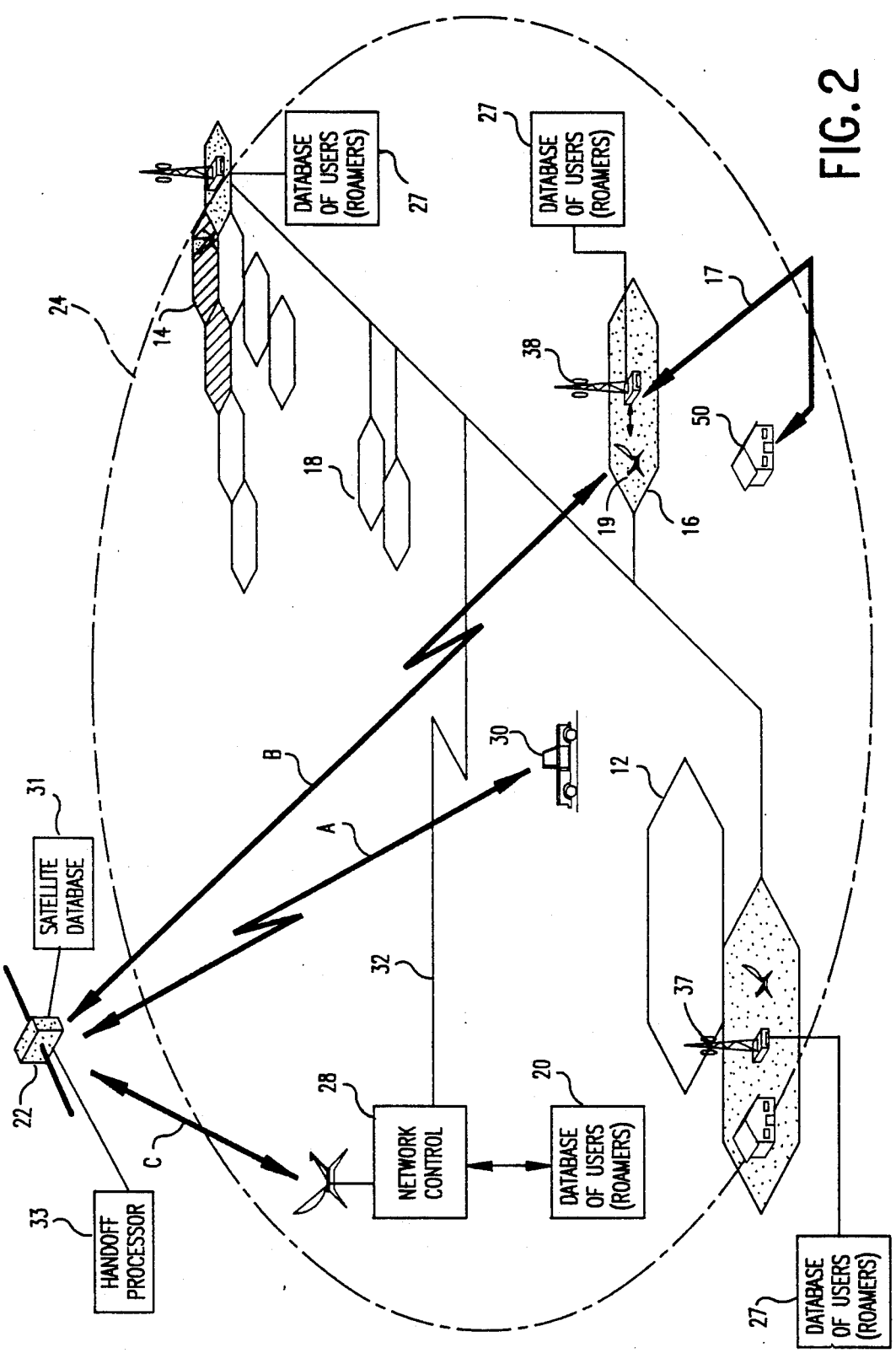
FIG. 2 is a figurative illustration of the integrated wireless telephone and orbiting satellite communications system showing how a first type of duplex communications circuit may be set up.
Figure 3:
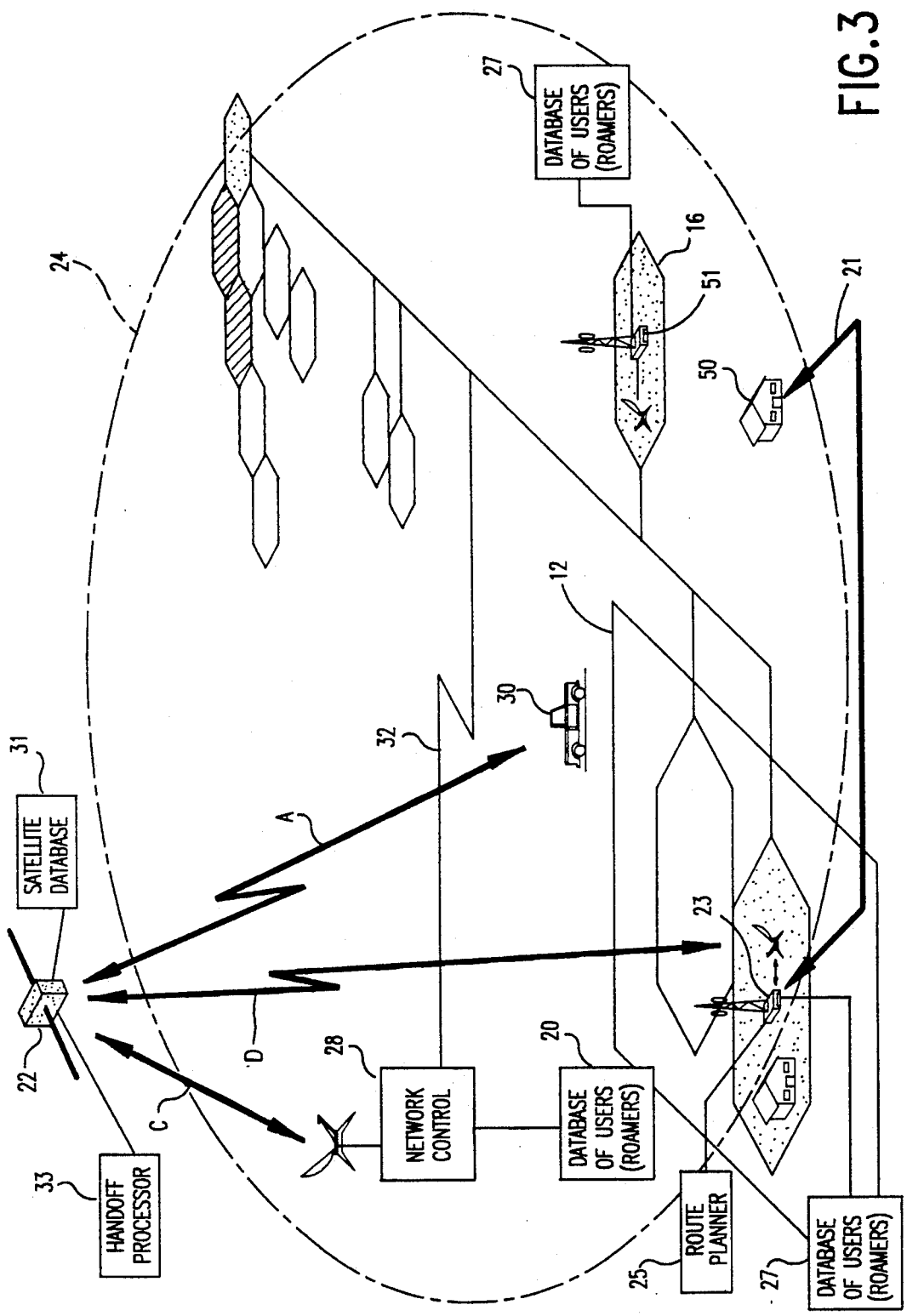
FIG. 3 is a figurative illustration of the integrated wireless telephone and orbiting satellite communications system showing how a second type of duplex communications circuit may be set up.

Referring to FIGS. 2 and 8A-8C, the user transmits data to the satellite which includes his User Identification Code (USER ID), location code, and a request for roaming. This signal is transmitted via link "A" in FIG. 8A to the satellites 301. The satellite receives the signal at the Communications RF processor Uplink(s) 602 and after downconverting it to baseband passes it to the decoder 636. The resulting signal is then applied to the user accept processor (USP) 634. User location coordinates are derived from the incoming signal, then Network Control coordinates and satellite ephemeris data are loaded into the USP 634 and the Link Path Geometry (LPG) is calculated. The satellite USP 634 then compares its LPG against the LPG criteria for other satellites in view of the user and depending on selected criteria either accepts or rejects the call. If rejected, all processors are reset. If accepted, the user ID, location and request for access codes are passed to the call setup processor 640 where it is recognized as a logon request. The request is formatted and coded in the call setup processor 640 and applied to the encoder 614 for processing. After processing the signal is sent via line "Q" to the Communications RF Processor 606 and transmitted to the Network Control via link 38 ("C") (FIG. 8A) and as shown in FIG. 2.

Referring to FIG. 7 for the details of Network Control (NC) processing, the signal from the satellite is received by the NC 401 by antenna 403 and routed to the Satellite RF Unit(s) 417 where the signal is received and passed to modem 416 for demodulation into a data stream. The data stream is passed to decoder 411 and after decoding is routed to computer 410 which issues instructions to the database 405 of the NC 401 to include the user number, location, active status, and other related data in the database of roamers and identifying the user as roaming in the SSA. The network controller 404 then verifies the user as acceptable for authorization to use the system. If the user is not acceptable for authorization to use the system the database is not updated and the system does not respond. Upon acceptability of the user as an authorized roaming user the computer 410 updates the network database (Step B5, FIG. 10B) and routes a satellite update data signal to the Satellite Database Update Processor 414 for formatting. The formatted signal is then sent to the encoder 415 and after encoding, is passed to the Modem 416 for modulation and then to the Satellite RF Unit 417 for transmittal to the satellite 301,302 by antenna 403. The process continues as described hereinbelow relating to satellite database updating.

CDMA OPERATION OF REQUEST FOR ROAMING BY USER IN SSA

In a CDMA system, the process is similar to that described hereinabove. Two methods are available for the user to access the satellite system as described above. Method 1: An FDM-FM or other modulation using contention multiple access, operating on a "hailing" channel, may be used to signal the satellite 301. Method 2: A special identifying CDMA code placed in the User Request Unit 535 (FIG. 5). The appropriate satellite RF processor must be fitted with the corresponding modulation equipment. The process proceeds as described hereinabove.

REQUEST FOR SSA ROAMING BY A USER LOCATED IN A TCTSA

Figure 10B:
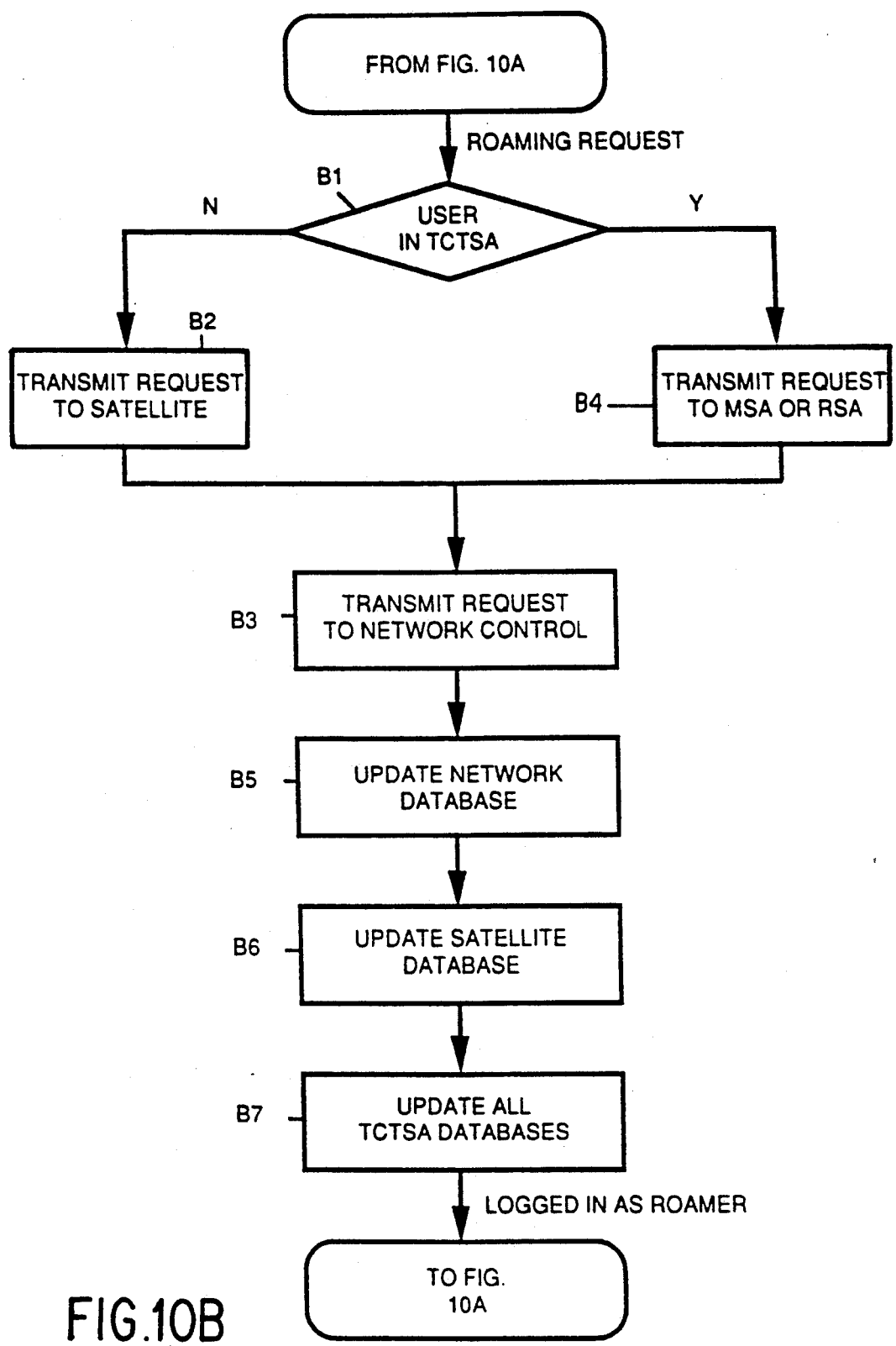

The second method of requesting roaming in an SSA is to make the request while in a TCTSA. The user either manually or automatically activates his Wireless Satellite Telephone (WST) User Request Unit 535 (FIG. 5). A signal, including the user number, location, and codes to indicate the user wishes to roam in the SSA, is sent to the Cellular Telephone System (CTS) 101(102) by antenna 505(506) (FIG. 4; FIG. 10B, Step B4). The CTS 101 formats a data signal which is conveyed via landline 130 to the TCO 105 and then to the NC 401 via landline 141. Referring to FIG. 7, the signal is then applied to the network controller 404 (Step B3) and after decoding is routed to the computer 410 which issues instructions to the database 405 of the NC 401 to include the user number, location, his active status, and other related data in the database of roamers and identify him as roaming in the SSA. The network controller 404 then verifies the user as acceptable for authorization to use the system. If the user is not acceptable for authorization to use the system the database is not updated and the system does not respond. Upon indication of acceptability of the user as an authorized roaming user, the computer 410 updates the network database (Step B5) and routes a satellite update data signal to the Satellite Database Update Processor 414 for formatting. The formatted signal is then sent to the encoder 415 and after encoding, it is sent to the modem 416 for modulation and then to the Satellite RF Unit 417 for transmittal to each of the satellites 301,302 by antenna 403. The process continues as described hereinbelow relating to the updating of the satellite database.

CDMA OPERATION OF A REQUEST FOR ROAMING BY USER IN SSA

CDMA operation is similar to that described hereinabove and need not be repeated.

SATELLITE DATABASE UPDATE TO INCLUDE USER

After request signals are received at the Network Control 28 (401) and processed as explained hereinabove, the Network Control 28 (401) transmits network update data to the TCTSAs and Network Control stations on the packet switched network 32 and to all satelites 22 (301,302) as they become individually available to the network control station. In the satellites, the Communications RF Processor - Uplink(s) 602,603 processes the signal and converts it to a baseband data stream and applies it to the decoder 612. The decoder 612 extracts the network update signal and applies it to the Database Processor 638 which provides codes necessary to update the Satellite Database of Users 642 (FIG. 10B, Step B6). This process is the same whether the user is signalling from the SSA or is signalling from a TCTSA. The network control also notifies all of the TCTSA databases (Step B7).

CALL INITIATION FROM A USER (AN INBOUND CALL)

Figure 10C:
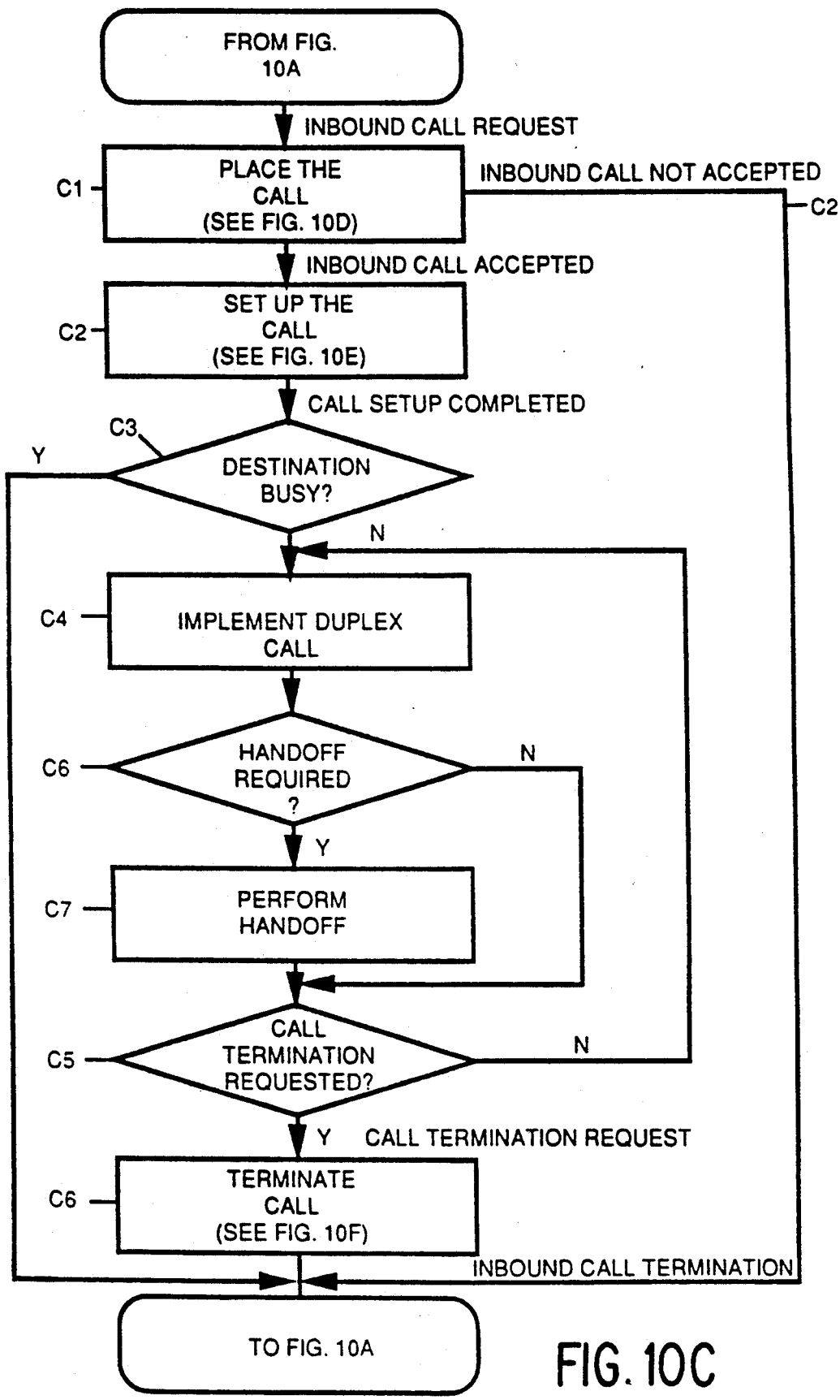

Referring to FIG. 5, the process to initiate a call from a user while roaming in an SSA is as follows:

To make a call request, the user dials the destination telephone 106,107 telephone number by the use of the keypad of the Cellular Telephone 503 (See FIG. 10A, Step C, FIG. 10C, Step C1). The number is passed to the Satellite Control Unit 530,531 and into the Request/ACK generator 533. The user number 532 is added to the signal and passed to the encoder 524 and processed into a data stream which is applied to the Modem 526. Two methods are available for the user to access the satellite. Method 1: An FDM-FM or other modulation using contention multiple access, operating on a hailing channel, may be used to signal the satellite 301. Method 2: Alternatively a special identifying CDMA code placed in the User Request Unit 535. The satellite 301 RF processor must be fitted with the corresponding modulation equipment. The resulting modulated signal is then applied to the Satellite RF Converter 527 and routed to the Satellite antenna 522 and transmitted to the satellite(s) within range.

SATELLITE ACCEPTANCE OF CALLS FROM USER (INBOUND)

Figure 10D:
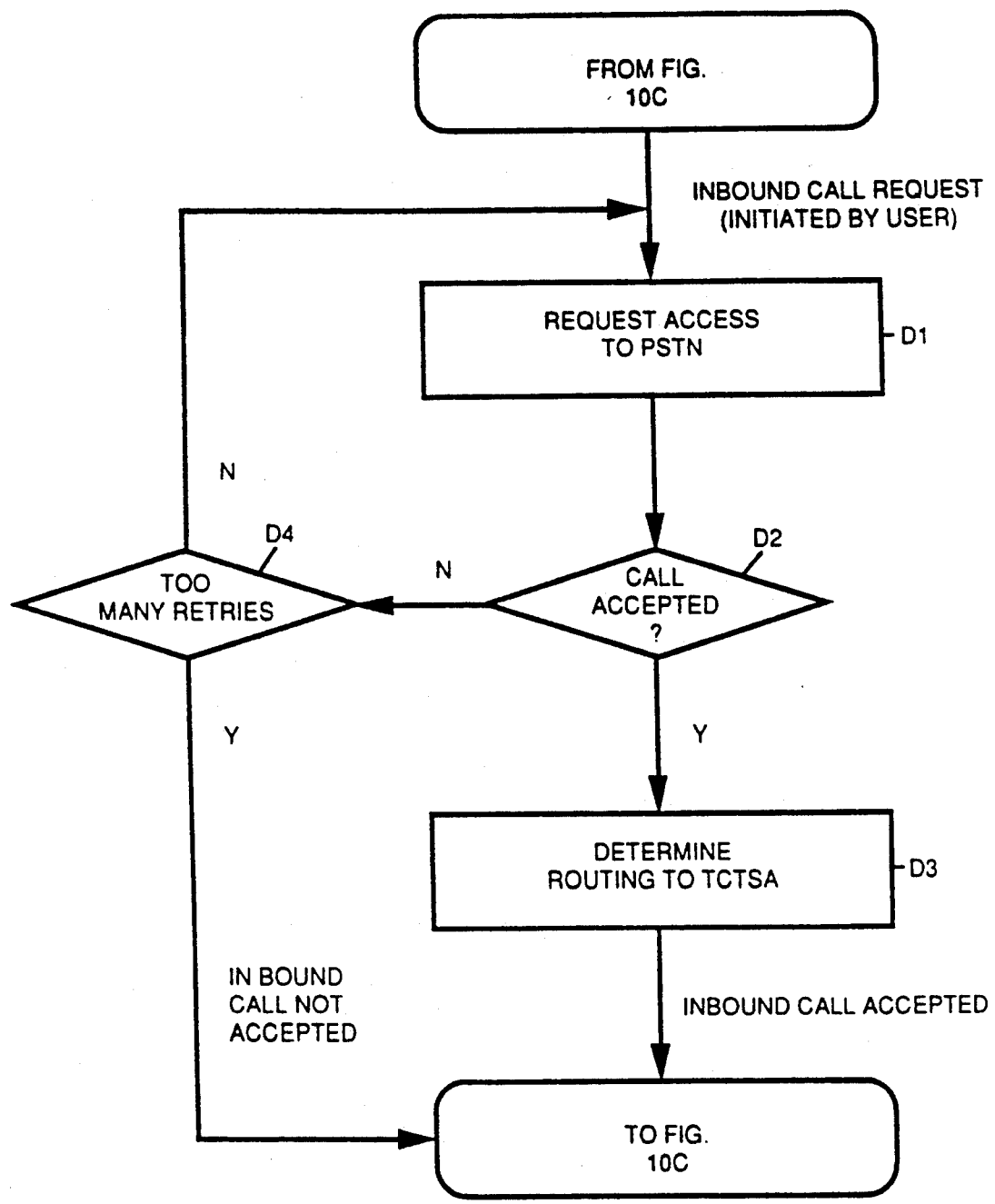
Figure 10E:
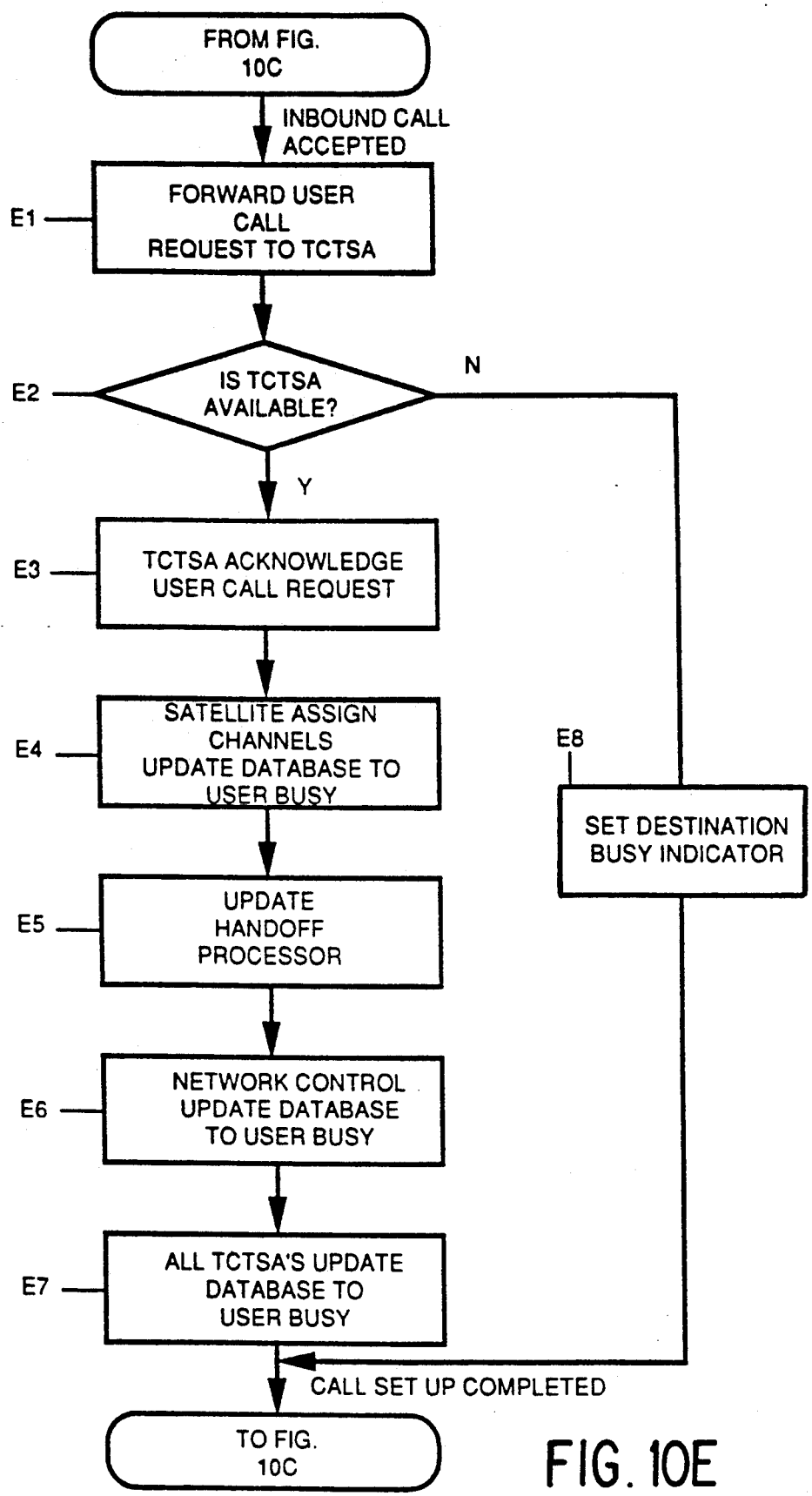
Figure 10F:
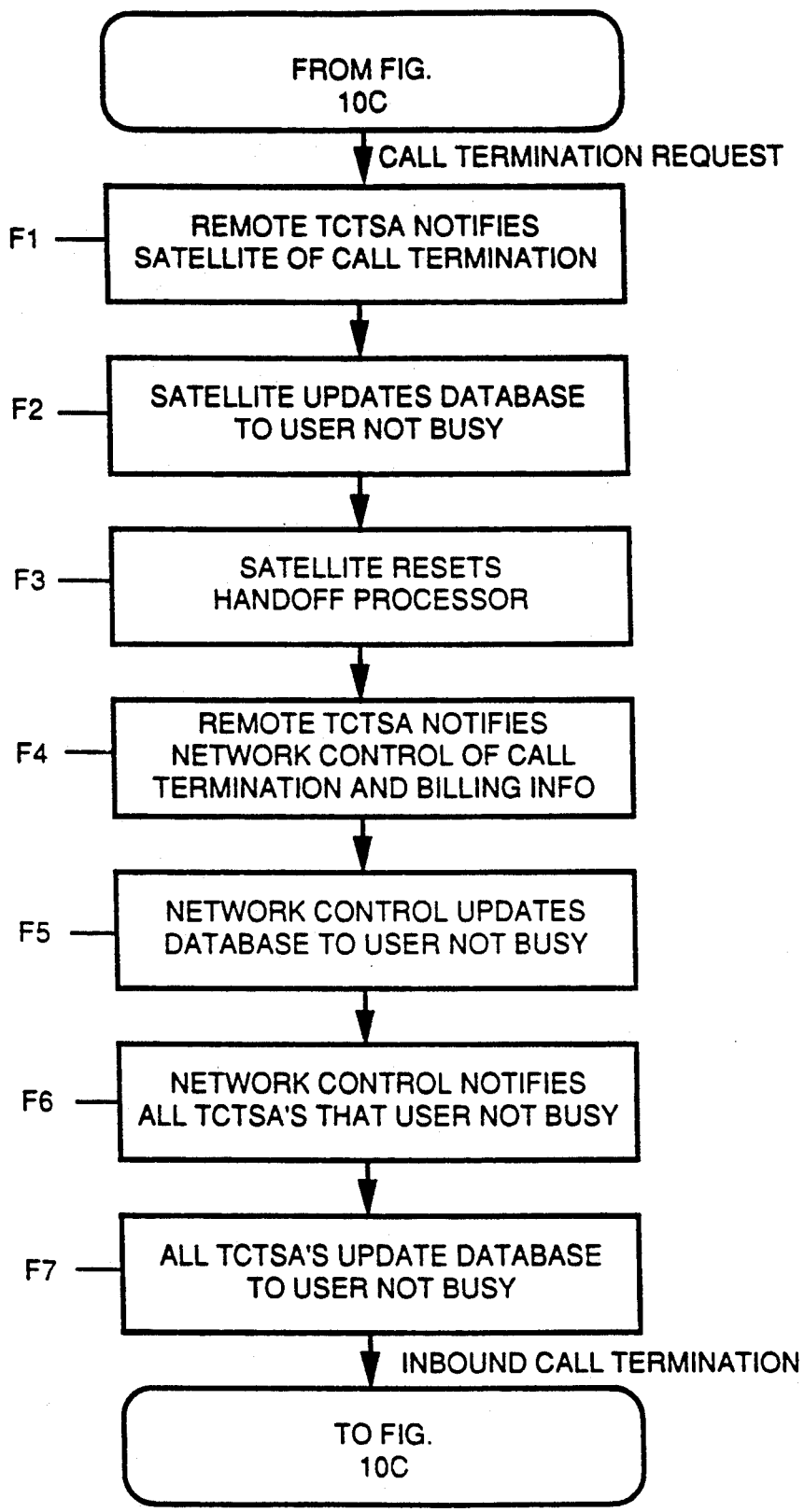
Figure 10H:
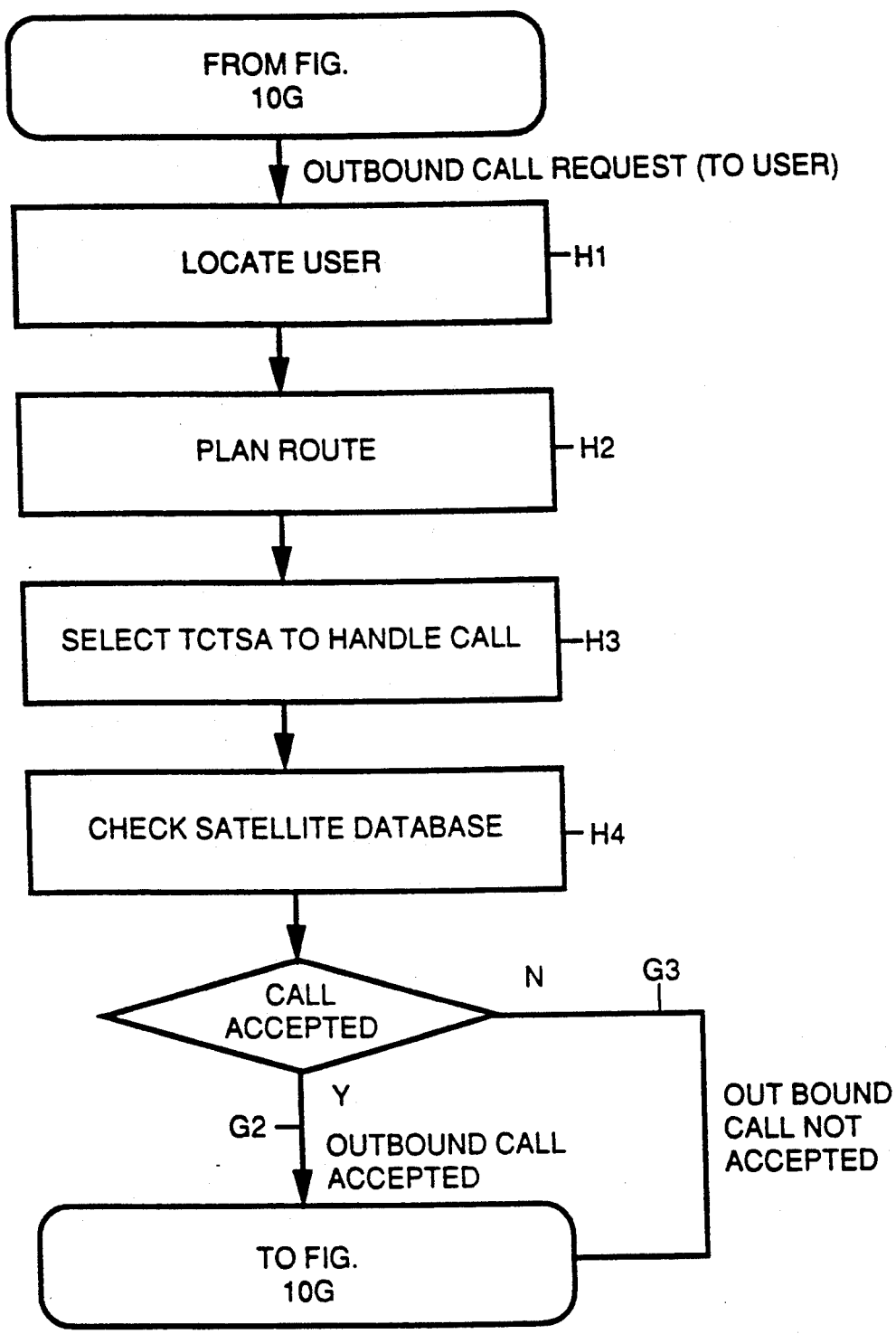
Figure 10:
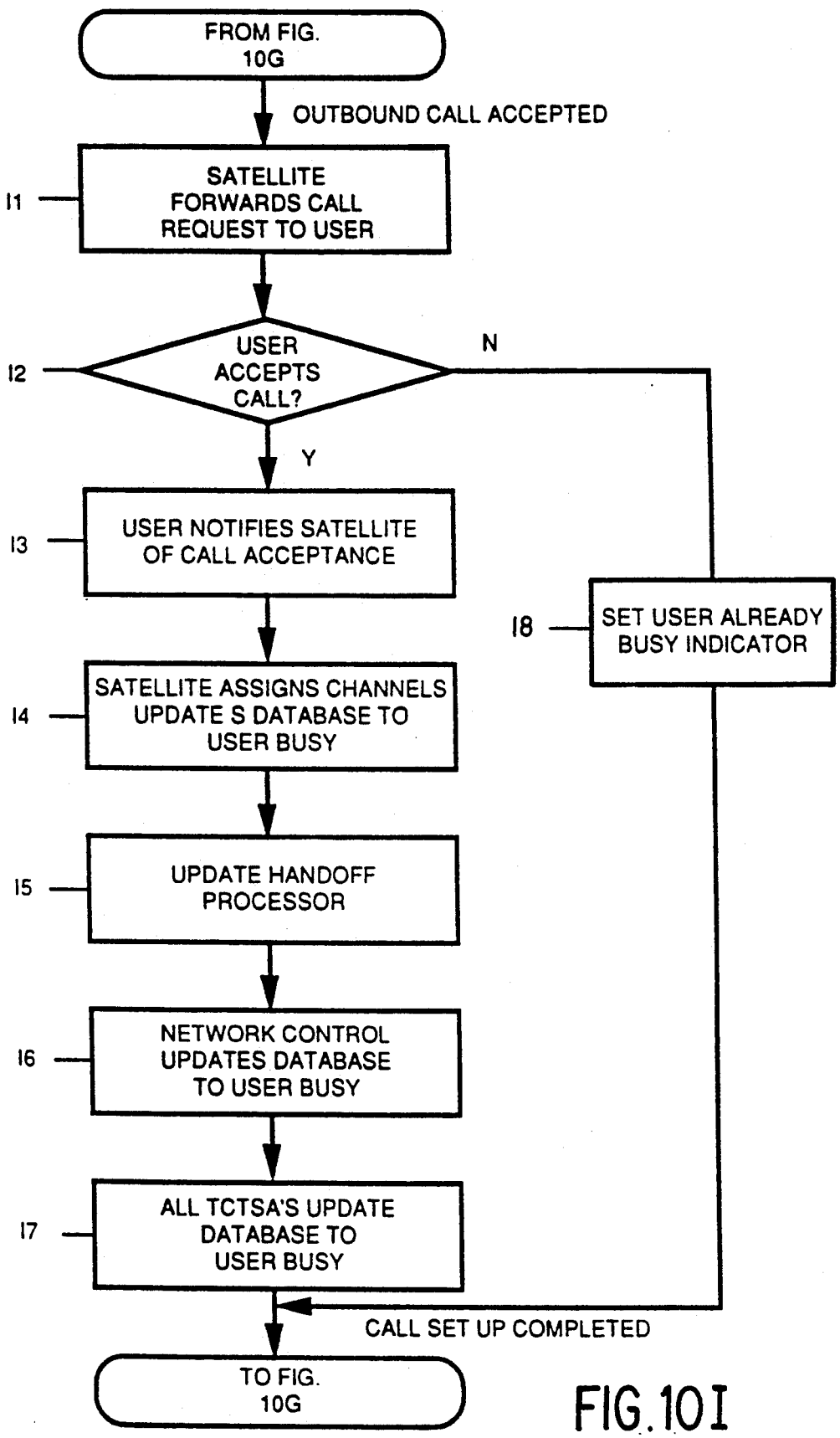
Figure 10J:
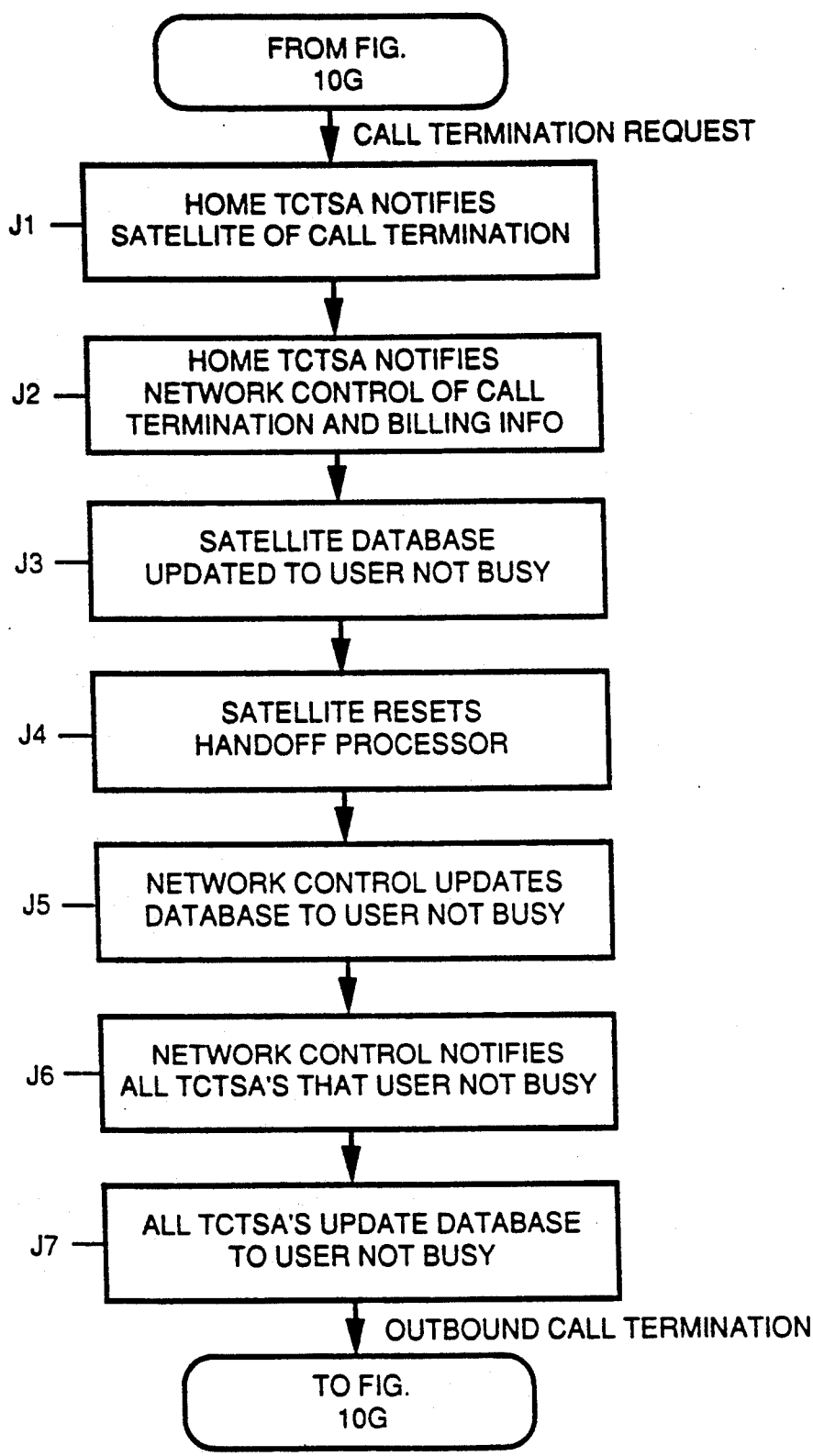

In the process of accepting calls at the satellite, the signals are received by the Communications RF processor uplink equipment in the satellite(s) in view as shown in FIG. 8A for non-CDMA operation and FIG. 9A for CDMA operation (FIG. 10C, Step C1). The signals are decoded and user ID and Call Destination are sent to the user accept processor (USP) 634. The user ID is checked against the stored ID information held in the Satellite Database of Users for acceptability of the user (FIG. 10D, D1). If no access is detected the call request is terminated (FIG. 10C, C2; FIG. 10D, D2). If access is allowed (D2), the user location coordinates and satellite ephemeris data are loaded into the USP 634 from the Satellite Database of Users 642 and the Satellite Ephemeris Net Control & Destination Database 646. The call is set up (Step C2, FIG. 10C) Call Destination Telephone Number (CDTN) is checked for home gateway assignment. If home gateway is detected, its location is loaded and the Link Path Geometry (LPG) is calculated (H2). The satellite USP 634 then compares its LPG against the LPG criteria for other satellites in view of the user and depending on selected criteria either accepts or rejects the call. If rejected, all processors are reset. If accepted the user ID and call destination number are passed to the call route processor 639. The call route processor 639 codes the route as a home gateway call and passes the information to the route acceptance processor 641.

If the CDTN is a value which is not the home gateway assigned, the USP 634 assigns gateway criteria to the user and loads gateway selections. If at least one gateway is available, the maximum LPG or other LPG according to criteria is calculated. The satellite USP 634 then compares its LPG against the LPG criteria for other satellites in view of the user and, depending on selected criteria, either accepts or rejects the call. If rejected, all processors are reset. If accepted, the user ID and call destination number are passed to the call route processor 639. The call route processor 639 loads ephemeris, destination codes, and other criteria and calculates the gateway to handle the call. (Call acceptance is indicated as Step D2, FIG. 10D).

CALL SETUP PROCESS (INBOUND) INBOUND CALL ACCEPTANCE UPDATE OF ROUTE, CALL SETUP DATABASE, AND UPDATE OF HANDOFF PROCESSOR. (CALL ACCEPTED)

The call route and the satellite ephemeris data, user ID and other codes are then routed to the Route Acceptance Processor 641 for destination acceptance. Based on certain received signal information, ephemeris, call route, and other data compared to stored threshold values, the Route Acceptance Processor 634 makes the decision to accept or reject the call. If the call is rejected, the signals are routed to the Termination Processor 652 to reset the system. If the call is accepted, the call setup data is routed to the Destination Formatter 654. At the Destination Formatter 654, the route is extracted and signals are sent to update the Handoff Processor 632. Data on the route, the user ID and other information are stored in the active Call Setup Database 648.

INBOUND CALL SETUP, NOTIFICATION OF REMOTE MSA or RSA

Assuming that the call was accepted, the destination data is applied to the call setup processor 640 by the Destination Formatter 654. A set of codes for channel assignment (non-CDMA operation) or a set of CDMA codes obtained by the CDMA processor 658 from the satellite CDMA code database 661 to be used for the call is generated (for CDMA operation) and is added to the destination data for the home or remote MSA/RSA which are then passed to the encoder 614. The resulting datastream is passed to the Communications RF Processor—Downlink(s) 606 or 607 and transmitted to the home or remote MSA/RSA (FIG. 4).

RECEPTION AND PROCESSING AT THE HOME OR REMOTE MSA/RSA

Referring to FIG. 4, the signal is received at the MSA/RSA equipment 101,102 by antenna 203,204 and applied to the satellite RF unit(s) 238 within SIE's 201, 202 (see FIG. 6). After down conversion to baseband the signals are demodulated by the modem 237 and routed to the decoder 234. The decoded baseband signals are then applied to the cellular telephone interface unit 230. The cellular telephone interface unit 230 processes the call and applies the desired destination number to the cellular telephone system w/switch 221. If channels are available at the gateway, the cellular telephone interface unit generates ACK codes for the call request processor and destination code signals for the cellular telephone system with its switch 221. Referring first to the ACK codes, the call request processor signals the ACK generator 236 to signal the satellite and the user that it is ready to place the call. This ACK signal is applied to the encoder 232 and the modem 237 and passed to the satellite RF unit(s) 238 and after processing applied to the antenna 203,204 for transmitting to the satellite. Referring to FIGS. 4 and 8, the ACK signal is transmitted over link "D", 34 or link "B", 36 depending on whether the gateway is the home gateway or a remote gateway. Referring to FIGS. 8B and 9B, the ACK signal is applied to the decoder 612. The ACK signal is then routed to the route accept processor 641 which updates the handoff processor 632 and the call setup database 648 containing the active users to include the user as active. For CDMA operation the ACK signal is passed from the route accept processor 641 to the call setup processor 640 which adds the call CDMA codes obtained by the CDMA processor 658 from the satellite CDMA code database 661 to the signal and processes the codes. The resulting data is applied to the encoder 614 and via line "Q" is passed to the communications RF processor downlink(s) 607. The resulting signal is transmitted over link "B", 36 to the user.

Referring to FIGS. 4 and 5, the signal is received by the user satellite telephone 501,502 by its antenna 522,523 and applied to the user's satellite RF converter 527. The resulting signal is passed to the modem 526 and after demodulation is decoded by the decoder 525. The resulting signal is sent to the request/ACK generator 533 which shifts the cellular telephone 503 to the proper channel for non-CDMA operation or provides the modem 526 with the call CDMA codes for reception.

Referring now to the destination signals sent to the cellular telephone switch, in its normal fashion the cellular telephone system w/switch 221, as shown in FIG. 4, via the terrestrial system lines 120,121, connects to the desired call destination 106,107 via the telephone central office 105. Once the call destination answers the call duplex operation begins.

INBOUND CALL ACCEPTANCE RETRY NOTICE (CALL NOT ACCEPTED)

If the call is not accepted (FIG. 10C, Steps C1, C2), the Route Acceptance Processor 641 generates codes indicating NOT OK—RETRY, these signals are applied to the Termination Processor 652 and the Call Setup Processor 640. The Termination Processor 652 resets the database processor 638 to show the user valid and retrying. The database processor 638 resets the Satellite Database of Users 642 to show retry. The Call Setup Processor 640 formats a signal to the user to show that the call must be retried, and passes the data to the encoder 614. The encoded signal is applied to the Communications RF Processor—Downlink(s) and transmitted to the user. After a random period of time the user retrys the call.

Referring to FIG. 5, the retry signal is received by the user's satellite antenna 522,523 and passed to the user's Satellite RF Unit 527. The resulting datastream is demodulated by the Modem 526 and passed to the decoder 525. The decoded retry signal is applied to the Retry Generator 534. When, after a prescribed time delay, the comparator in the Retry Generator 534 shows positive it signals the call request generator to retry. A counter will limit the number of retrys.

INBOUND CALL DUPLEX CALL PROCESS

Reference is made to FIGS. 8A and 9A for satellite signal routing and to FIG. 5 for system operation, the duplex call process for SSA operation by a user.

USER TO CALL DESTINATION DIRECTION

Referring to FIGS. 4 and 5 to consider the user's end of a duplex call, the user communicates to the call destination 106,107 by activating the Cellular Telephone 503 which passes digital voice or data to the encoder 524, which encodes the signal into a datastream, which is passed to the Modem 526. The Modem modulates the signal and passes it to the Satellite RF Converter 527 for transmission to the satellite by the antenna 522,523.

SATELLITE RECEPTION OF USER TO CALL DESTINATION SIGNALS SATELLITE NON-CDMA MODULATION OPERATION

The uplink signals and downlink signals are received and transmitted by the satellite directly to and from the user over link "A", 34 and relayed after satellite onboard processing to an appropriate gateway selected in the call setup process (FIGS. 1, 2, 8A).

CDMA OPERATION

The uplink signals and downlink signals are sent and received by the satellite directly to and from the user over link "A", 34. The signals are processed in the satellite with a configuration as shown in FIGS. 9A, 9B & 9C. Received signals are processed by the Communications RF processor and applied to the voice and data channel. Unlike non-CDMA communications, the signals are then applied to the spread spectrum modem and codec(s) 656 (FIG. 9B). CDMA codes are applied from CDMA code processor 658 to the voice and data signals and then routed to the voice and data channels in the communications RF processor and thence to the RF equipment in the Communications RF processor down-link(s) 607 for transmitting to the ground. The signals are downlinked via link "A" 34, or "D" 34, depending on the gateway selected in the call setup process.

Referring to FIG. 6, the signals are received by the MSA/RSA equipment 101,102 by antenna 203,204 and applied to the satellite RF unit(s) 238. After processing the signal is applied to the modem 237 and thence to the decoder 234 if necessary. (If the user equipment generates data that conforms to industry standards, the decoding step may be bypassed.) After decoding, the signal is applied to the cellular telephone interface unit 230 and thence to the Cellular Telephone System w/switch 221. The system then applies the signal to the terrestrial interface 120,121 via the telephone central office 105 and thence to the call destination device 106,107.

USER TO CALL DESTINATION DIRECTION

In a similar manner the signals from the call destination 106,107 are processed. Referring to FIG. 4, the call destination user activates his Telephone Device 106,107 which passes his voice or data over landlines 122,123 to the Telephone Central Office (TCO) 105. According to the invention, these signals are routed to the selected MSA/RSA Cellular Telephone System 101,102 by landlines 120,121. The landline system is not bypassed. Referring to FIG. 6, the Cellular Telephone System 221 routes the signals to the Cellular Telephone Interface Unit 230 where the signals are processed and fed to the encoder 232. After encoding, the signals are applied to the Modem 237 and after modulation are sent to the Satellite RF Unit 238 (see FIG. 6). The resulting RF signal is sent to the antenna 203,204 for transmission to the Satellite 301,302 (FIG. 4).

SATELLITE RECEPTION OF CALL DESTINATION TO USER SIGNALS SATELLITE NON-CDMA MODULATION OPERATION

The uplink signals and downlink signals are received and transmitted by the satellite. The signals are transmitted from the gateway over link "D", 34 or link "B", 36 depending on the gateway selected during the call setup process. The signals are processed in the satellite as shown in FIGS. 8A, 8B, & 8C. Received signals are processed by the Communications RF processor and applied to the Decoder. The voice or data is routed to the data or voice signal processors and after formatting are stored in the Satellite Memory Unit RAM or buffers until activated by the Data and Voice Signal Processor. The signals are then routed to the Data or Voice signal processor and coded with the destination information and then routed to the encoder. The resulting data stream is routed to the Communications RF Processor for downlinking. The signals are downlinked to the user via link "B" 36.

CDMA OPERATION

The uplink signals and downlink signal are sent and received by the satellite. The signals are transmitted from the gateway over link "D", 34 or link "B", 36 depending on the gateway selected during the call setup process. The signals are processed in the satellite as shown in FIGS. 9A, 9B, & 9C. Received signals are processed by the Communications RF processor and applied to the voice and data channel(s). These signals are then applied to the spread spectrum modem and codec(s) 656 shown in FIG. 9B. CDMA codes are applied from the CDMA code processor to the voice and data signals and then routed to the voice and data channels in the communications RF processor and thence to the RF equipment in the Communications RF processor down-link(s) for transmission to the ground. The signals are downlinked to the user via link "B" 36.

USER RECEPTION OF SIGNALS

Referring to FIG. 5, the user receives communications in the following manner: The signals are received by the antenna 522 and sent to the Satellite RF converter 527, then passed to the modem 526. The demodulated baseband signals are then decoded by the decoder 525 and sent to the cellular telephone 503,504 for further processing into audio or data.

HANDOFF OF INBOUND AND OUTBOUND CALLS

The handoff of both inbound and outbound calls is accomplished by the same means. The satellite system, by communicating between satellites determines the satellite to take the call with the initial satellite requesting a handoff to a second satellite which becomes the call handler. Subsequent handoffs are accomplished in the same manner with the second satellite becoming the handoff initiator and a third satellite becoming the call handler, and so on.

A signal in the handoff processor 632 is generated at a preset time from loss of signal as determined by the handoff processor 632 based upon the user location, destination MSA/RSA gateway, satellite ephemeris and other data stored in the call setup database 648 in the Satellite Memory Unit 610. The signal, with a request for handoff, handoff preset time, User Id, and Call Setup Data, and other routing data such as CDMA codes for the call are generated by the handoff processor 632 and sent to the SAT/SAT encoder 630. After encoding the signal is sent to the SAT/SAT RF Processor 604 for modulation and transmission to the associated SAT/SAT antenna. The SAT/SAT antenna radiates the signal to the other satellites in its view.

The Signals are received by the other satellites in view of the requesting satellite. After processing in the SAT/SAT RF Processor 604 of the receiving satellite, the signals are sent to a decoder 636. After decoding, the request for handoff is routed to the Database Processor 638 for verification of user database and thence to the Call Route Processor 639. The Call Route Processor 639 processes the call as a handoff using the defined gateway, then the Route Acceptance Processor 641 and Handoff Processor 632 on the receiving satellite process the request for handoff. If the route is accepted, the Route Acceptance Processor 641 notifies the Handoff Processor 632, which places the user data into the call setup database 648 and sets up the Data Signal Processor 660 and the Voice Signal Processor 662 or in the case of CDMA access enters the CDMA code for the call into the call setup database 648. The Route Acceptance Processor 641 then formats an ACK signal to be sent to the other satellites signifying that the satellite is ready to take the handoff. The signal is routed to the SAT/SAT encoder 630 and after encoding to the SAT/SAT RF Processor 604 and after modulation and RF processing the signal is radiated to the Requesting Satellite and other satellites in view. At that time, the satellite is enabled by the handoff processor 632 to receive and transmit signals from the User and the MSA/RSA that is handling the call. (The process is indicated as Steps G6, G7, FIG. 10G or Steps C6, C7, FIG. 10C.)

RECEPTION OF THE HANDOFF ACK BY THE INITIATING SATELLITE

The handoff ACK (H/0 ACK), generated by the Receiving Satellite Handoff Processor is received by the Initiating satellite. This signal is received by the SAT/SAT RF Processor and after demodulation is routed to the decoder. After decoding, the H/0 ACK is routed to the Handoff Processor which instructs the Route Acceptance Processor to terminate routing and handoff the communications to the receiving satellite at the preset time. After the preset time, the call setup database is reset to remove the user and the call setup data from the database.

In the case that no satellite determines an acceptable routing, no H/0 ACK will be received by the Initiating Satellite. The handoff processor 632 waits a preset time as determined by a handoff reset timer 633 for a H/0 ACK, and assuming the satellite receives no such signal, the Handoff Processor initiates the reset timer 633 which after a preset time initiates retrys the process of handoff. This may be effected a number of times before the satellite notifies the call handling MSA/RSA of impending loss of signal. The Handoff Processor 632 then generates a NO H/0 signal and routes it to the Call Setup Processor 640. The Call Setup Processor 640 formats a signal to the MSA/RSA that is handling the call to notify the MSA/RSA of impending loss of signal. This signal is routed to the encoder, and after encoding it is routed to the Communications RF Processor for downlink to the call handling MSA/RSA. The signal is received at the MSA/RSA antenna 203,204 (FIGS. 4 and 6) and routed to the Satellite RF Unit(s) 238. After down conversion, the signal is applied to the modem 237 for demodulation and routed to the decoder 234. The notice of impending loss of signal is then sent to the Cellular Telephone Interface Unit 230. The Cellular Telephone Interface Unit 230 processes a signal to the Cellular Telephone System 221 which breaks the call and may notify the user and the caller that an impending loss of signal is about to occur.

CALL TERMINATION

Calls are terminated in the same manner for user initiated calls or caller generated calls (FIG. 10C to FIG. 10F or FIG. 10G to FIG. 10J) as follows: Referring to FIG. 6, the Cellular Telephone System 221 senses an on-hook condition, from either the user or the call destination, and signals the Cellular Telephone Interface Unit (CTIU) 230 to activate call termination. The CTIU signals the call termination processor 233 to generate a call termination signal and route it to the encoder 232 (see FIG. 6). The encoded signal is then applied to the Modem 237, and this modulated signal is routed to the Satellite RF Unit 238. After processing, the signal is applied to the antenna 203,204 for transmitting to the satellite from the home MSA/RSA 12 or remote MSA/RSA 16 (FIG. 2). The Cellular Telephone System also activates codes which are transmitted over landlines to Network Control 28. Referring to FIG. 4, these signals are routed over the network landlines 130,131 to the TCO 105 and thence to the NC 401 by landlines 140,141. Referring to FIG. 7, these signals are processed and used to update the Database of Users 405 to show the user not busy. Certain other business data is also routed to the NC 401, such as billing information, call time, rates or other such information. The network control station notifies the remote MSA/RSA gateways 101,102 via packet switched network 141 and 130,131 via telephone central office 105 or other such network of the current status of the user. Referring to FIG. 6, the cellular telephone system w/switch 221 then updates the roaming user database 222 to show the user not busy.

Referring to FIG. 2, the signals sent to the satellite to show call termination are received by the satellite for resetting processors and updating the databases. Referring to FIGS. 8A and 9A, the signals are received by the Satellite Communications RF Processor 602,603. The resulting baseband signal is decoded and sent to the Termination Processor 652 shown in FIGS. 8B and 9B. The Termination Processor 652 generates reset signals and applies them to the database processor 638 and the handoff processor 632. The database processor 638 updates the Satellite Database of Users 642 to show the user not busy. The handoff processor 632 resets the route accept processor 641 and clears the user from the call setup database 648.

CALL INITIATION BY A CALLER (AN OUTBOUND CALL)

Referring to FIG. 4, the process to initiate a call from a caller to a user roaming in a service area is as follows:

CALL REQUEST (OUTBOUND)

A call request is made when a caller makes a terrestrial PSTN or other network call to the user's home or equivalent TCTSA (gateway), rather than to a nearby uplink which would bypass the normal terrestrial structure. The call is routed to the roamer's (user's) home TCTSA system. Referring to FIG. 4, the caller using a telephone device 106,107 dials the telephone number of the user equipment 501,502 by the use of any means provided by the device. The number is passed via the terrestrial or other means lines 122,123 to the Telephone Central Office 105 or other central switching office, and thence via terrestrial lines or other means 120,121 to the Cellular Telephone System equipment 101,102 located at the user's home gateway. Referring to FIG. 6, the request for access to the user is processed by the Cellular Telephone System w/switch 221 which interrogates the resident copy of the roaming user database 222 to determine if the user is roaming in the SSA. If the user is roaming in the SSA and is not busy, the user number, location, and other user data is retrieved from the database and passed to the satellite interface equipment 201. The signal is applied to the route planner 240. The route planner processes the information, and, using stored satellite ephemeris and user information, selects the gateway to be used for the call.

CALL ROUTING (OUTBOUND)

There are two possibilities for call routing of bound calls: (1) a local call such that the home gateway is desired to handle the call and, (2) a non-local call such that a remote gateway is desired to handle the call.

LOCAL USER (LOCATED SUCH THAT THE HOME GATEWAY MAY BE USED)

If the user location is such that the home gateway may be used for the call, the route planner 240 codes the signal as a local call and passes it to the cellular telephone system w/switch 221. If the call was coded as a local call, the cellular telephone system w/switch 221 routes the call to the cellular telephone interface unit 230. (Refer to CALL SETUP PROCESSING for the next steps.)

REMOTE USER (LOCATED SUCH THAT THE HOME GATEWAY IS NOT USED)

If the user location is such that a remote gateway is selected, the desired gateway is coded as a remote call and passes it to the cellular telephone system w/switch 221 to process the call, whereupon it instructs the cellular telephone system W/Switch 221 to switch the call to the selected MSA/RSA gateway. The cellular telephone system w/switch 221 signals the remote MSA/RSA gateway via packet switched network lines 130,131 of the existence of the incoming call request and the information for call setup. The cellular telephone system w/switch 221 then calls the remote MSA/RSA gateway equipment so selected 101,102 via line 120,121. The remote MSA/RSA gateway is now connected to the caller unit 106,107 via the Telephone Central Office or other means 105. The cellular telephone system w/switch 221 receives the coded signal and opens a line. The information for the call setup is sent to the Cellular Telephone Interface Unit 230 for call setup processing.

CALL SETUP PROCESSING

Referring to FIG. 6, the Cellular Telephone System with switch 221 generates codes which are passed to the Cellular Telephone Interface Unit 230 and thence to the call request processor 235. The call request processor 235 formats the call request for transmission to the satellite and returns the formatted data to the cellular telephone interface unit 230. Depending on the instructions of the call request processor, the user number and other data is passed to the encoder 232 and processed into a data stream which is applied to the Modem 237. The two methods previously described are available for the user to access the satellite, namely, an FDM-FM or other modulation using contention multiple access, operating on a hailing channel, or a special identifying CDMA code. The satellite 301 RF processor must be fitted with the corresponding modulation equipment. The resulting modulated signal is then applied to the Satellite RF Unit(s) 238 and routed to the antenna 203,204 (see FIG. 4) and transmitted to the satellite(s) 301 within range.

SATELLITE ACCEPTANCE OF CALLS FROM GATEWAY (OUTBOUND)

There is a home gateway procedure and a remote gateway call set up procedure. The TCTSA signals from the antenna (FIGS. 4 and 6) 203,204 are transmitted to the satellites for call acceptance and satellite route acceptance. Referring to FIGS. 8A and 9A, the transmissions are made over link "D", 34 if the home gateway was selected by the route planner or over link "B", 36 if a remote gateway was selected.

The signals are received by the Communications RF processor uplink equipment in the satellite(s) in view. The signals are decoded and user ID is sent to the user accept processor (USP). The satellite database is checked for verification of access. If no access is detected, the call request is terminated. If access is allowed, the user location coordinates and satellite ephemeris data, and the gateway coordinates are loaded into the USP, and the Link Path Geometry (LPG) is calculated. The satellite USP then compares its LPG against the LPG criteria for other satellites in view of the user and depending on selected criteria either accepts or rejects the call. If rejected, all processors are reset. If accepted, the user ID is passed to the call route processor. If no access is detected or if no satellite provides an ACK signal within a preset time (discussed in the next section), the retry generator 239 generates a retry signal and passes it to the call request processor 235 which retrys the call to the user.

If OK, a signal routes the call destination data to the Call Route Processor where it is combined with the satellite ephemeris and compared to the satellite database of users. The call route processor uses the database to locate the roaming user to which to route the call. The resulting call route and satellite ephemeris data are then sent to the route acceptance processor in the next step.

OUTBOUND CALL ACCEPTANCE UPDATE OF ROUTE, CALL SETUP DATABASE, AND UPDATE OF HANDOFF PROCESSOR. (CALL ACCEPTED)

The call route and the satellite ephemeris data, user ID and other codes are then routed to the Route Acceptance Processor for destination acceptance. Based on certain received signal information, ephemeris, call route, and other data compared to stored threshold values, the Route Acceptance Processor makes the decision to accept or reject the call. If the call is rejected, the signals are routed accordingly. If the call is accepted the call setup data is routed for acceptance processing. The route is extracted and applied to the Destination Formatter, and signals are sent to update the handoff processor. Data on the route, the user ID and other information are stored in the active Call Setup Database in memory unit 610.

OUTBOUND CALL SETUP, NOTIFICATION OF REMOTE MSA or RSA

Assuming that the call was accepted the destination data is applied to the call setup processor by the Destination Formatter. A set of codes for channel assignment (non-CDMA operation) or a set of CDMA codes to be used for the call are generated by the CDMA code processor 658 from the database 661 (for CDMA operation) and added to the destination data for the user and then are passed to the encoder. The resulting datastream is passed to the Communications RF Processor—Downlink(s) and transmitted to the user.

RECEPTION AND PROCESSES AT THE USER EQUIPMENT

Referring to FIG. 5, for reception and processing of outbound call at the user, the user's Cellular Satellite Telephone 501,502 antenna 522,523 receives the signal and routes it to the Satellite RF converter 527. The signal containing channel information or CDMA codes for the call is downconverted by the desired user WST and routed to the Modem 526. The resulting datastream is applied to the Decoder 525. After decoding, the data is sent to the request/ACK generator 533. Codes are generated and sent to the Cellular Telephone 503,504 to ring the user. If desired, the Cellular Telephone signals the ACK generator 533 to send signalling codes to the satellite via the encoder 524. If not desired, no ACK signal is generated. The ACK signal is passed from the encoder 524 to the Modem 526 and thence to the Satellite RF converter 527. The resulting ACK signal is transmitted to the Satellite 301 via the antenna 522,523. The user wireless satellite telephone 501,502 then either shifts frequency to the channel selected by the satellite or loads the CDMA code for the call into the modem. The user then waits for duplex operation to begin.

The user transmits an ACK message which is used to update the satellite database and the call setup database. The signal is transmitted to the satellite and processed by the Communications RF processor - uplink(s). The resulting baseband signals are applied to the decoder, and the network update signal and the ACK signal are extracted. The network update signal is used to update the satellite Database of Users to show the user "busy". The ACK signal is applied to the route acceptance processor which signals the handoff processor to become active and the signals the call setup database to place the user in the current call setup database.

OUTBOUND CALL SETUP, NOTIFICATION OF MSA or RSA GATEWAY

Assuming that the call was accepted, the ACK data is applied to the call setup processor as shown in FIGS. 8B or 9B by the Destination Formatter. A set of codes for channel assignment (non-CDMA operation) or a set of CDMA codes to be used for the call are generated (for CDMA operation) for the remote MSA or RSA are passed to the encoder. The resulting datastream is passed to the Communications RF Processor—Downlink(s) and transmitted to the home or remote MSA/RSA.

RECEPTION OF ACK SIGNAL AT THE HOME OR REMOTE MSA/RSA

The signal is received at the MSA/RSA equipment 101,102 by antenna 203,204 and applied to the satellite RF unit(s) 238 (see FIG. 6). After down conversion to baseband, the signals are demodulated by the modem 237 and routed to the decoder 234. The decoded baseband signals are then applied to the cellular telephone interface unit 230. The cellular telephone interface unit 230 processes the information and shifts the satellite RF unit(s) to the selected frequency for non-CDMA operation or provides the modem(s) with the selected CDMA code for the call.

The cellular telephone interface unit 230 then applies the voice and data signal stream to the encoder 232 or directly to the modem 237, depending on the incoming signal structure, and thence to the assigned channel of the satellite RF unit(s) 238, thence to the antenna 203,204 (see FIG. 4). Duplex operation can now begin.

OUTBOUND CALL ACCEPTANCE RETRY NOTICE (CALL NOT ACCEPTED)

If the call is not accepted the Route Acceptance Processor generates codes indicating NOT OK—RETRY, these signals are applied to the Termination Processor and the Call Setup Processor. The termination Processor resets the Database Processor to show the user valid and retrying. The database processor resets the Satellite Database of Users to show retry. The Call Setup Processor formats a signal to the user to show that the call must be retried, and it passes the data to the encoder. The encoded signal is applied to the Communications RF Processor—Downlink(s) and transmitted to the gateway. After a random period of time, the gateway retrys the call.

Referring to FIG. 6, the retry signal is received by the gateway's satellite antenna 203,204 and passed to the gateway Satellite RF Unit 238. The resulting datastream is demodulated by the Modem 237 and passed to the decoder 234. The decoded retry signal is applied to the Retry Generator 239. When, after a prescribed time delay, it signals the call request generator to retry. A counter will limit the number of retries.

OUTBOUND CALL DUPLEX CALL PROCESS

The outbound call duplex process is identical to that of a user initiated call described above.

HANDOFF OF OUTBOUND CALLS

The handoff processes are identical to that of a user initiated call described above.

CALL TERMINATION (OUTBOUND CALL)

The Call termination processes are identical to that of a user initiated call described above.

NOTIFICATION OF INTENT TO DISCONTINUE ROAMING BY THE USER

As in the notification to the system of the intent to commence roaming, there are two methods by which the user can notify his intent to discontinue roaming. The user has two options: he may notify Network Control (NC) of his intention while in the SSA and out of range of a TCTSA and have his request processed via a satellite relay to the NC, or he may make his request via a participating TCTSA. These two cases are now explained (See FIGS. 10A, 10K.)

REQUEST FOR DISCONTINUANCE OF ROAMING BY USER IN THE SSA

The user notifies the system by way of the satellite that he desires to be deleted from the Database of Roamers in the SSA. Referring to FIG. 5, the user initiates a termination request by manually or automatically activating the User Request Unit 535. A signal is passed to the Request/ACK Generator 533. This generates a termination request which is passed to the encoder 524 and modulated by the Modem 526. The resulting signal is routed to the Satellite RF Converter 527 and then to the antenna 522,523 for transmission to the satellite.

The signal is sent to the satellite(s), are received by the Communications RF processor and down converted to baseband. After downconverting to baseband, the signal is passed at "M" to the decoder 612 in FIG. 8B. The resulting signal is thence applied to the user acceptance processor 634. The user location coordinates, Network Control coordinates, and satellite ephemeris data are loaded into the USP 634, and the Link Path Geometry (LPG) is calculated. The satellite USP 634 then compares its LPG against the LPG criteria for other satellites in view of the user and depending on selected criteria either accepts or rejects the call. If rejected, all processors are reset. If accepted, the user ID, location and request for termination codes are passed to the call termination processor 652 where it is recognized as a log off request. The request is passed to the call setup processor 640 and is formatted, coded, and applied to the encoder 614 for processing. After processing, the signal is sent via line "Q" to the Communications RF Processor 606,607, and then it is transmitted to the Network Control via link "C".

RECEPTION OF THE TERMINATION SIGNAL AT NETWORK CONTROL

Referring to FIG. 7, the downlink signal is received at the satellite antenna 403 and applied to the Satellite RF Unit(s) 417. The resulting baseband signal is demodulated in the Modem 416 and sent to the decoder 411. The resulting data is sent to the computer 410 which instructs the Database of Users 405 to delete the user from the list of SSA Roaming Users. The Cellular Telephone System databases 222 in FIG. 6 are notified via the Network Control 404 over landline 140,141 and via TCO 105 and landline 130,131 of the new status of the user. The signals are applied to the Cellular Telephone System w/switch 221 which in turn signals the Roaming User Database to delete the user from the list of users having access to the SSA.

Referring again to FIG. 7, the Network Control 401 then formats a signal and signals all satellites in the system to remove the user from their Satellite Database of Users. The computer 410 instructs the Satellite Database Processor 414 to format a signal which is sent to the Encoder 415. The encoded signal is modulated by the Modem 416 and sent to the Satellite RF Unit(s) 417. The resulting signal is applied to the antenna 403 for transmitting to the satellite(s). The Network Control sends a signal to the Satellite which is received by the Communications RF Processor. The resulting baseband signal is applied to the decoder. The decoder takes the network update signal and routes it to the Database Processor which deletes the user from the Database of Users.

CDMA OPERATION OF REQUEST FOR TERMINATION OF ROAMING BY USER IN SSA

Under CDMA operation, the process of a request for termination is similar to that described for a request for roaming. Two methods are available as previously mentioned: (1) An FDM-FM or other modulation using contention multiple access, operating on a hailing channel, or (2) a special identifying CDMA code placed in the User Request Unit 535. The process continues as described hereinabove.

REQUEST FOR DISCONTINUANCE OF ROAMING BY USER IN A TCTSA

Figure 10K:
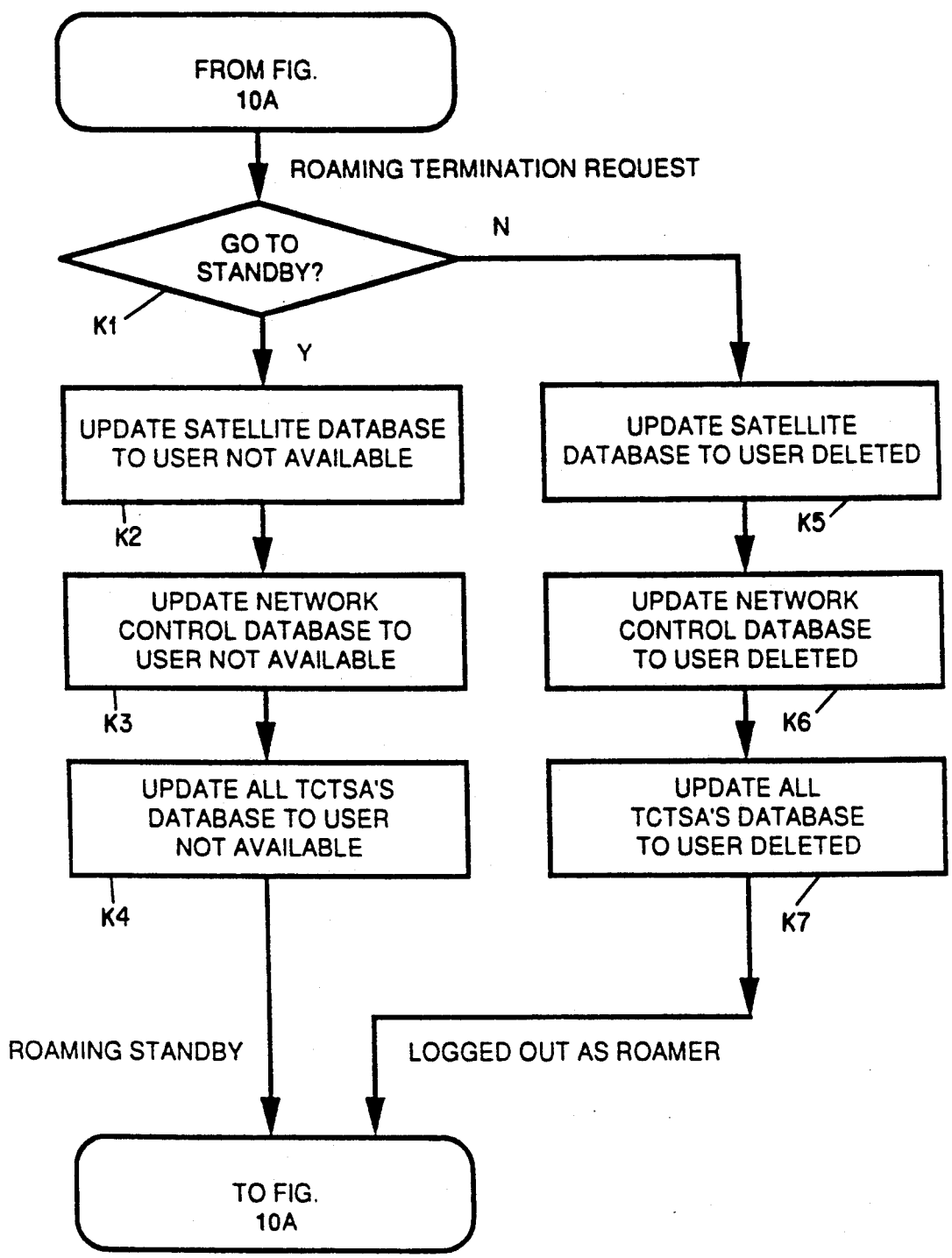
Figure 10L:
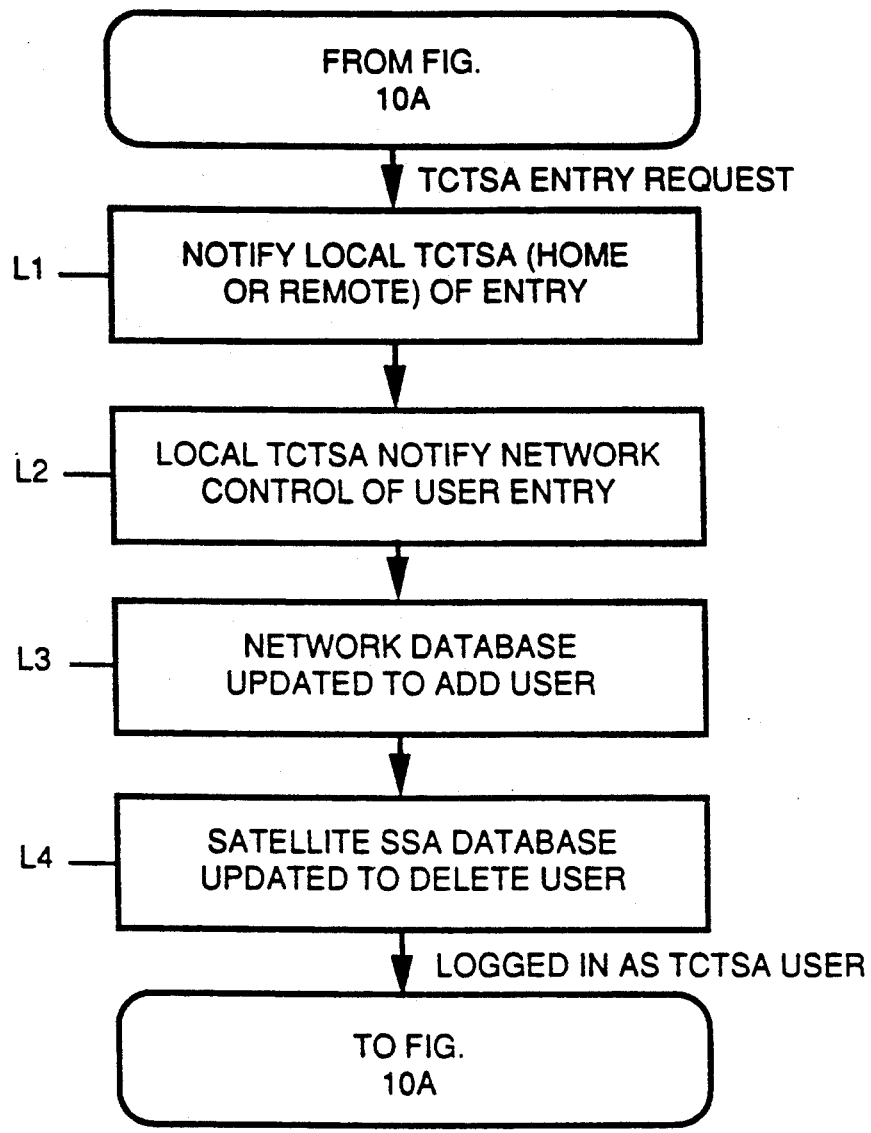

Referring to FIG. 1 and FIG. 10K, the user re-enters a remote MSA/RSA or his Home MSA/RSA and either automatically or manually notifies the system by way of the TCTSA that he desires to be deleted from the Database of Roamers in the SSA. Referring to FIG. 5, the user equipment 501,502 initiates a termination request by manually or automatically activating the User Request Unit 535. A signal is passed to the Request/ACK Generator 533. This generates a termination request which is passed to the Cellular Telephone 503,504 the resulting signal is routed to the antenna 505,506 for transmission to the TCTSA. This signal is routed to the Network Control. Referring to FIG. 7, the signal is received via landline 140,141 at the network controller 404 which instructs the Database of Users 405 to delete the user from the list of SSA Roaming Users. The Cellular Telephone System databases 222 are notified via the Network Control 404 over landline 140,141 and via TCO 105 and landline 130,131 of the new status of the user.

The NC 401 then formats a signal, passed to the computer 410 to delete the user from the satellite database of users, and eventually signals all satellites in the system in order to remove the user from the database. Referring to FIG. 7, the computer 410 instructs the Satellite Database Processor 414 to format a terminate signal which is sent to the Encoder 415. The encoded signal is modulated by the Modem 416 and sent to the Satellite RF Unit(s) 417. The resulting signal is applied to the antenna 403 for transmitting to the satellites as they become available.

The Network Control sends a signal to the Satellite which is received by the Communications RF Processor 602, 603. The resulting baseband signal is applied to the decoder 612. The decoder 612 takes the network update signal and routes it to the Database Processor 638 which deletes the user from the Database of Users 642.

The invention has now been explained with reference to specific embodiments. Other embodiments will be apparent to those of ordinary skill int this art in light of this disclosure. It is therefore not intended that this invention be limited, except as indicated by the appended claims.

What is claimed is:

1. A wireless telephone/satellite telecommunications system operative in connection with a terrestrial communications system, comprising:
    at least one satellite in earth orbit;
    at least one gateway for communicating between said at least one satellite and the terrestrial communications system;
    a network database management system;
    at least one wireless telephone transceiver user capable of two-way communication with said at least one satellite, said wireless telephone transceiver user identified with a single terrestrial service area having linking capabilities to said network database management system;
    a database, said database containing identification of each user, a physical location of said user, and a home gateway of said user, wherein portions of said database corresponding to users that are logged on to the system are maintained in each said at least one satellite;
    means for maintaining and updating said portions of said datasbase in substantially real time; and
    means for communicating between said network database management system and said portions of said roaming database, such that each one of said orbiting satellites establishes communications links to and from said user and said terrestrial communications system via a gateway based on information stored on-board said satellite in said portions of said database and further based on on-board processing, so that said user can send and receive traffic via said terrestrial communications system.

2. The system according to claim 1, wherein at least a first satellite and a second satellite contain portions of said database, said system further including means for creating on said second satellite those communications links needed to accomodate traffic from those active users leaving the range of the first satellite; wherein
    said effecting means includes means for transferring to the second satellite that part of the database containing those active users leaving the range of the first satellite and entering the range of the second satellite.

3. The system according to claim 2, wherein said second satellite trails said first satellite in passage over said user.

4. In a wireless telephone/satellite telecommunications system operative in connection with a terrestrial communications system for communicating traffic, at least two satellites in orbit, each said satellite comprising:
- communications processor uplink means for receiving uplinked communications signals from users, gateways, and network controls;
- communications processor downlink means for transmitting communications signals to users, gateways, and network controls;
- first decoder means coupled to said communications processor uplink means for decoding uplinked communications signals;
- memory means having at least a satellite database of users stored on board each said satellite and a call setup database;
- user acceptance processor means coupled to said satellite database of users for processing user requests;
- call setup processor means coupled to said user acceptance processor means and to the call setup database for processing call setup requests;
- database processor means, route acceptance processor means, and call route processor means coupled to one another and to said satellite database of users and said call setup database, for planning routing of calls;
- satellite-to-satellite processor crosslink means for communicating control signals with other like satellites in earth orbit;
- control processor uplink/downlink means for receiving and transmitting control signals to and from satellites and network controls;
- handoff processor means coupled to said call setup processor means, said route acceptance processor means, and said user acceptance processor means, for processing handoffs between satellites;
- second decoder means coupled to said user acceptance processor means and to said handoff processor means, for decoding signals from other satellites; and
- first encoder means coupled to said route acceptance processor means, providing handoff acknowledgment signals, and to said handoff processor means for communicating encoded signals to other satellites.

5. In the system according to claim 4, wherein each satellite further comprises:
- a CDMA code database in said memory means; and
- CDMA code processor means coupled to receive data through said first decoder means for providing CDMA codes from said CDMA code database to said handoff processor and to said communications processor downlink means.

6. In the system according to claim 4, wherein each satellite further comprises:
- voice and data buffer and storage means for temporarily storing voice and data information for relay;
- first data signal processor means coupled to receive and extract data signals through said first decoder means and coupled to said voice and data buffer and storage means for temporarily storing said data signals;
- second data signal processing means coupled to receive data signals temporarily stored in said voice and data buffer and storage means for transmittal to said communications processor downlink means;
- first voice signal processing means coupled to receive and extract voice signals through said first decoder means and coupled to said voice and data buffer and storage means for temporarily storing said voice signals; and
- second voice signal processing means coupled to receive voice signals temporarily stored in said voice and data buffer and storage means for transmittal to said communications processor downlink means.

7. The system according to claim 6 wherein each said satellite is in low-earth orbit.

8. The system according to claim 1 wherein at least one user is roaming outside of the terrestrial service area of said user.

* * * * *